United States Patent
Barry et al.

(10) Patent No.: US 12,050,106 B2
(45) Date of Patent: Jul. 30, 2024

(54) SAGNAC EFFECT RF BASED ELECTROMAGNETIC GYROSCOPE USING PULSED EXCITATION

(71) Applicants: Daryl W. Barry, Wilmette, IL (US); Nir Efraim Joseph Tal, Haifa (IL); Dan Wolberg, Moshav Yanuv (IL)

(72) Inventors: Daryl W. Barry, Wilmette, IL (US); Nir Efraim Joseph Tal, Haifa (IL); Dan Wolberg, Moshav Yanuv (IL)

( * ) Notice: Subject to any disclaimer, the term of this patent is extended or adjusted under 35 U.S.C. 154(b) by 242 days.

(21) Appl. No.: 17/578,352

(22) Filed: Jan. 18, 2022

(65) Prior Publication Data

US 2022/0228865 A1    Jul. 21, 2022

Related U.S. Application Data

(60) Provisional application No. 63/199,722, filed on Jan. 20, 2021.

(51) Int. Cl.
*G01C 19/72* (2006.01)

(52) U.S. Cl.
CPC ......... *G01C 19/726* (2013.01); *G01C 19/721* (2013.01)

(58) Field of Classification Search
CPC ............................ G01C 19/721; G01C 19/726
See application file for complete search history.

(56) References Cited

U.S. PATENT DOCUMENTS

| | | | |
|---|---|---|---|
| 3,861,220 A | 1/1975 | Felsenthal, Jr. | |
| 4,135,822 A | 1/1979 | Ezekiel | |
| 4,274,742 A | 6/1981 | Lustig | |
| 4,299,490 A * | 11/1981 | Cahill | G01C 19/726 356/464 |
| 4,326,803 A | 4/1982 | Lawrence | |
| 4,480,915 A | 11/1984 | Arditty | |
| 4,514,088 A | 4/1985 | Coccoli | |
| 4,588,296 A | 5/1986 | Cahill | |
| 4,661,964 A | 4/1987 | Haavisto | |

(Continued)

OTHER PUBLICATIONS

"The Finite-Difference Time Domain Method (FDTD)", Chapter 3, undated.

(Continued)

*Primary Examiner* — Violeta A Prieto

(74) *Attorney, Agent, or Firm* — Zaretsky Patent Group PC; Howard Zaretsky

(57) ABSTRACT

A novel and useful electronic gyroscope exploits the Sagnac resulting in a detectable phase or frequency shift when an electromagnetic wave travels inside a rotating medium. These shifts in phase or frequency are measured and used to determine the angular velocity of the rotating medium. Three such media can be positioned in mutually perpendicular planes to detect 3D rotational movement. At least one loop acts as an RF transmission media that accommodates simultaneous bidirectional propagation of RF signals while being capable of separating between signals counter propagating in two opposite directions through the use of a switching matrix. A switching matrix and loop buffer function to sample pulses, amplify them, and reinject them back into one of the loops. A time measurement unit functions to detect the time difference between the counter propagating pulses which is used to calculate the rotation rate of the loop.

20 Claims, 19 Drawing Sheets

(56) References Cited

U.S. PATENT DOCUMENTS

| | | | |
|---|---|---|---|
| 4,673,293 | A | 6/1987 | Sanders |
| 4,768,880 | A | 9/1988 | Tur |
| 5,018,857 | A | 5/1991 | Sanders |
| 5,313,266 | A | 5/1994 | Keolian |
| 5,325,174 | A | 6/1994 | Danko |
| 5,363,192 | A | 11/1994 | Diels |
| 5,442,442 | A | 8/1995 | Kanegsberg |
| 5,872,877 | A | 2/1999 | Haavisto |
| 7,522,284 | B2 | 4/2009 | Sanders |
| 7,751,055 | B2 | 7/2010 | Sanders |
| 8,274,659 | B2 | 9/2012 | Qiu |
| 2005/0196103 | A1 | 9/2005 | Kaplan |
| 2015/0362318 | A1* | 12/2015 | Tal ............ G01P 3/44 356/461 |

OTHER PUBLICATIONS

A.D. King, "Inertial Navigation-Forty Years of Evolution", GEC Review, vol. 13, No. 3, pp. 140-149, 1998.

E.J. Post, "Sagnac Effect", Reviews of Modern Physics, vol. 39, No. 2, pp. 475-493, Apr. 1967.

F. Aronowitz, "Fundamentals of the Ring Laser Gyro", Chapter 3, undated.

G.E. Stedman, "Ring-laser tests of fundamental physics and geophysics", Rep. Prog. Phys. vol. 60, pp. 615-688, 1997.

H. Loui, "1D-FDTD using MATLAB", ECEN-6006 Numerical Methods in Photonics Project-1, pp. 1-13, Sep. 2004.

J. Esterline, "Oscillator Phase Noise Theory vs. Practice", Application Note, Greenray Industries, Inc., Mar. 2008.

J. Hagedorn, "Crystal Oscillator Performance of the CDCLVC1310", Texas Instruments Application Report, pp. 1-13, Sep. 2012.

Karapetyan, G.. (2000). Microwave gyroscope—Novel rotation sensor. Microwave and Optical Technology Letters. 27. 10.1002/1098-2760(20001120)27:4<255::AID-MOP10>3.0.CO;2-X.

Kelly, A. G.. "The Sagnac Effect and Uniform Motion." (2011).

L. Lascari, "Accurate Phase Noise Prediction in PLL Synthesizers", Applied Microwave & Wireless, pp. 90-96, May 2000.

M. Ercoli et al., "A Passive Mixer for 60 GHz Applications in CMOS 65nm Technology", German Microwave Conference 2010, pp. 1-4, Mar. 2010.

M.F. Yagan, "The Sagnac Effect as Cumulative Doppler Effects", Jul. 2005.

P.G. Eliseev, "Theory of nonlinear Sagnac Effect", Opto-Electronics Review, vol. 16, No. 2, pp. 118-123, 2008.

Peng, Chao & Li, Zhengbin & Xu, Anshi. (2007). Rotation sensing based on a slow-light resonating structure with high group dispersion. Applied optics. 46. 4125-31. 10.1364/AO.46.004125.

R. Anderson et al., "Sagnac effect: A century of Earth-rotated interferometers", Am. J. Phys., vol. 62, No. 11, pp. 975-985, No. 1994.

Rosenthal, Adolph. (1962). Regenerative Circulatory Multiple-Beam Interferometry for the Study of Light-Propagation Effects. JOSA. 52. 1143-1147. 10.1364/JOSA.52.001143.

S. Merlo et al., "Fiber Gyroscope Principles", Handbook of Fibre Optic Sensing Technology, John Wiley & Sons Ltd., Chapter 16, 2000.

S.R. Kurtz, "Mixers as Phase Detectors", Tech-note, The Communications Edge, Watkins-Johnsons Comp., vol. 5, No. 1, Jan. 1978.

W.W. Chow et al., "The ring laser gyro", Reviews of Modern Physics, vol. 157, No., 1 pp. 61-104, Jan. 1985.

* cited by examiner

SAGNAC EFFECT RF BASED ELECTROMAGNETIC GYROSCOPE USING PULSED EXCITATION

REFERENCE TO PRIORITY APPLICATION

This application claims priority to U.S. Provisional Application Ser. No. 63/199,722, filed Jan. 20, 2022, entitled "Sagnac Effect RF Based Electromagnetic Gyroscope Using Pulsed Excitation," incorporated herein by reference in its entirety.

FIELD OF THE INVENTION

The present invention relates to the field of gyroscopy and more particularly relates to the field of electronically realized gyroscopes based on the Sagnac effect, wherein rotational movement of a loop is quantified based on the difference between the propagation paths for radio frequency (RF) signals that are propagating through it in two opposite directions.

BACKGROUND OF THE INVENTION

Gyroscopes are sensors that can sense rotational speed of the measurement frame with respect to an inertial one. In recent years, they have become ubiquitous in mobile devices (smart phones, tablets, etc.) while supporting applications such as gaming, augmented reality and optical image stabilization (OIS). A vibrating structure gyroscope, also known as a Coriolis vibratory gyroscope (CVG), is a class of gyroscope that uses solid state resonators of different shapes that function much like the halteres of an insect. The underlying physical principle is that a vibrating object tends to continue vibrating in the same plane as its support rotates. This type of device is also known as a Coriolis vibratory gyro because as the plane of oscillation is rotated, the response detected by the transducer results from the Coriolis term in its equations of motion ("Coriolis force"). Vibrating structure gyroscopes are simpler and cheaper than conventional rotating gyroscopes of similar accuracy. Miniature devices using this principle are a relatively inexpensive type of attitude indicator.

There is a need for a gyroscope that does not operate on a mechanical principle and thus does not suffer from the disadvantages of such mechanical based gyroscopes. The gyroscope should be radio frequency (RF) based, relatively simple, inexpensive to manufacture and can be able to be fabricated using available integrated circuit processes.

SUMMARY OF THE INVENTION

The present invention provides a novel and useful structure for a fully electronic gyroscope that may be fully incorporated into a single low-cost integrated circuit (IC) and integrated circuit package or an integrated circuit and printed circuit board combination. It alleviates the need for mechanical moving parts, which are used in MEMS based gyroscopes that require a special fabrication process. The apparatus and method of the present invention serve to detect and measure movement by exploiting the Sagnac effect that may be observed in radio frequency (RF) signals that propagate in two opposite directions in a loop that undergoes rotation.

The electronic gyroscope of the present invention exploits the Sagnac effect which results in a detectable phase or frequency shift when an electromagnetic wave travels inside a rotating medium. These shifts in phase or frequency can be measured using signal processing and are used to determine the angular velocity of the rotating medium. By combining three such media that are positioned in mutually perpendicular planes, general three dimensional (3D) rotational movement may be quantified and digitally communicated to a host device.

The apparatus of the present invention includes at least one loop having physical dimensions and electrical properties that allow it to act as an RF transmission media that accommodates simultaneous bidirectional propagation of RF signals while being capable of separating between signals counter propagating in two opposite directions through the use of a switching matrix.

While the loop undergoes rotational movement around an axis that passes perpendicular to the plane of the loop and through its center, the RF signal propagating within it in the direction of this rotation will effectively cover a greater distance than that propagating in the opposite direction. This will result in a phase difference between the two from which the rotational movement may be extracted by means of signal processing. In one embodiment of the present invention, where three such loops may be positioned substantially perpendicularly, any general three dimensional rotational movement may be extracted by establishing the extent of rotation experienced by each of the three loops.

The electronic gyroscope of the present invention may serve in many applications, such as user input devices into computers, tablets, mobile phones, game counsels, navigation systems in vehicles (manned or unmanned), vibration sensors for structure monitoring and seismology.

There is thus provided in accordance with the invention, a radio frequency (RF) electronic gyroscope, comprising one or more electrically conductive loops, a pulse generator circuit coupled to said switching matrix and operative to generate RF pulses for injection into said one or more loops, a switching matrix circuit coupled to said one or more loops and operative to inject said RF pulses output of said pulse generator into said one or more loops in clockwise (CW) and counterclockwise (CCW) directions interleaved in time, a time measuring unit (TMU) circuit operative to measure a differential time delay developed between counter propagating pulses in said one or more loops due to the Sagnac effect, and a calculation unit circuit operative to compute a rate of rotation from said differential time delay measurement.

There is also provided in accordance with the invention, a radio frequency (RF) electronic gyroscope, comprising a pair of electrically conductive loops, a pulse generator circuit operative to generate RF pulses for injection into said loops, a switching matrix circuit coupled to said loops and operative to inject said generated RF pulses into either of said loops in clockwise (CW) and counterclockwise (CCW) directions interleaved in time, a first loop buffer circuit coupled to said switching matric and operative to sample said RF pulses as they exit each loop, amplify said sampled RF pulses, and reinject said amplified RF pulses into either of said loops in CW or CCW direction in accordance with one or more switch control lines, a time measuring unit (TMU) circuit operative to measure a differential time delay developed between counter propagating pulses in said paid of loops due to the Sagnac effect, and a calculation unit circuit operative to compute a rate of rotation based on said differential time delay measurement.

There is further provided in accordance with the invention, a radio frequency (RF) electronic gyroscope method, the method comprising providing one or more electrically conductive loops, generating and injecting one or more RF pulses into said one or more RF loops in clockwise (CW) and counterclockwise (CCW) directions interleaved in time, sampling and amplifying said RF pulses at the output of each loop and reinjecting restored RF pulses back into one of said loops, measuring a differential time difference developed between counter propagating pulses in said one or more loops due to the Sagnac effect, and computing a rate of rotation based on said differential time delay measurement.

BRIEF DESCRIPTION OF THE DRAWINGS

The invention is herein described, by way of example only, with reference to the accompanying drawings, wherein.

DETAILED DESCRIPTION OF THE INVENTION

Figure 1:
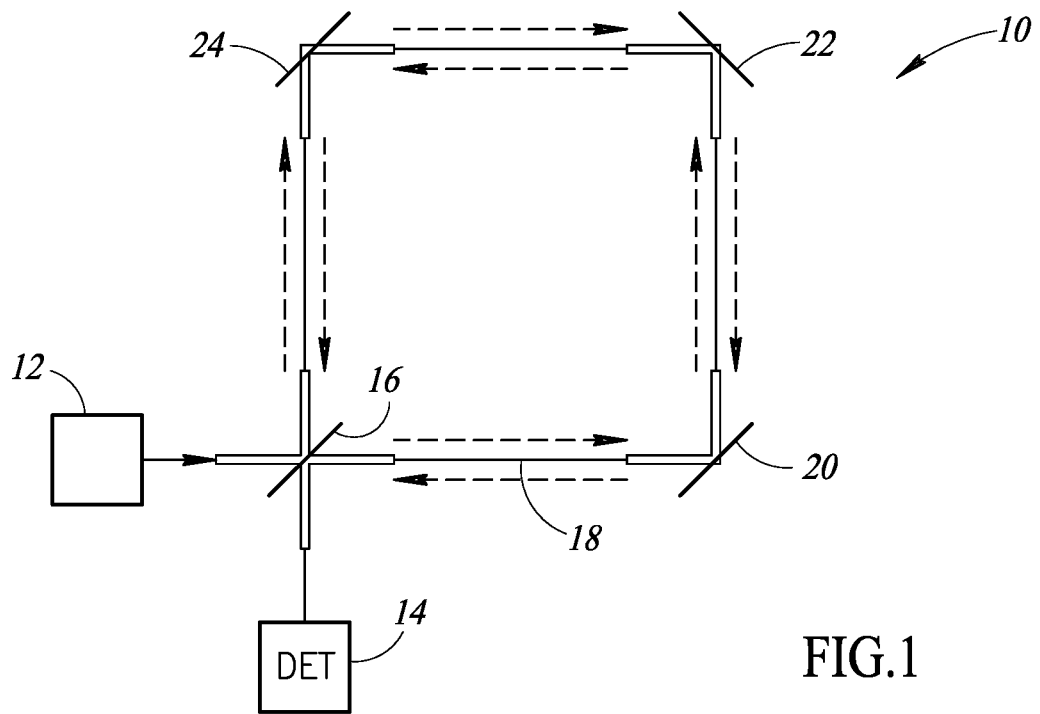
FIG. 1 is a block diagram illustrating an example fiber-optic gyroscope (FOG) based on the detection of phase shifts in laser beams that occur in accordance with the Sagnac effect.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object-oriented programming language such as Java, Smalltalk, C++, C# or the like, conventional procedural programming languages, such as the "C" programming language, and functional programming languages such as Prolog and Lisp, machine code, assembler or any other suitable programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network using any type of network protocol, including for example a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

The Sagnac Effect

The present invention, representing a fully electronic gyroscope, exploits the Sagnac effect, which results in a detectable phase or frequency shift that is experienced when an electromagnetic wave travels in a closed circuit inside a medium that is elicited by rotation. Measurements of these shifts in phase or frequency, based on signal processing, are used to determine the angular velocity of the rotating medium. By combining three such media that are positioned in mutually perpendicular planes, general three dimensional (3D) rotational movement may be quantified and digitally communicated to a hosting device.

In one embodiment, applications that exploit the Sagnac effect use lasers and light waves travelling in fiber optics and make use of interferometry to sense the Sagnac effect phase shift. Two distinct principles of operation that can be used are the fiber optic gyro (FOG) and the ring laser gyro (RLG).

A block diagram illustrating an example fiber optic gyro (FOG) based on the Sagnac effect is shown in FIG. 1. The gyroscope, generally referenced 10, comprises a monochromatic and coherent light source 12, detector 14 and fiber optic medium 18. Light from the source 12, typically based on a coherent laser beam of light, is injected into a fiber optic closed medium 18 through a half-silvered mirror 16. Mirrors 20, 22 and 24 are used to redirect the light to adjoining fiber segments. The light travels circularly in both directions through the closed medium, i.e. clockwise and counterclockwise. A detector 14, such as an interferometer, detects the phase shift between the two beams traveling in the two opposite directions.

According to the Sagnac effect equation, this phase shift can be calculated as follows:

$$\Delta\phi = 2\pi f \frac{4A\omega_{rot}}{c^2} \quad (1)$$

Where $\Delta\phi$ denotes the phase shift between the two beams, f denotes the laser beam frequency, A denotes the loop area, $\omega_{rot}$ denotes the mechanical angular rotational velocity and c denotes the speed of light.

The inherent drawback of this approach is that the phase shift $\Delta\phi$ is very small and difficult to detect due to the large $c^2$ factor in the denominator of Equation 1. To alleviate this, FOGs can use a very long optical fiber to increase the effective area A (appears in the numerator of Equation 1). This causes the FOG to be large and expensive and to be limited to cost-insensitive applications requiring extreme precision, while being unsuitable for low-cost mobile (handheld) devices of the type targeted by the present invention.

Figure 2:
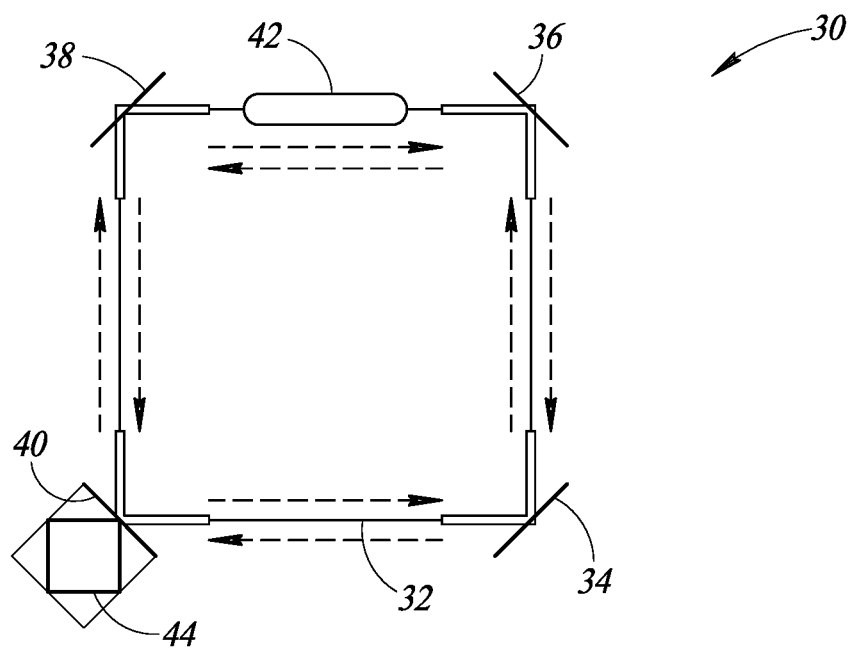
FIG. 2 is a block diagram illustrating a ring-laser gyroscope (RLG), wherein a phase shift in a laser beam, resulting from the Sagnac effect, is detected in an interferometer.

A block diagram illustrating an example ring laser gyro (RLG) also based on the Sagnac effect is shown in FIG. 2. The ring laser gyro, generally referenced 30, comprises a laser beam that is excited inside the laser excitation material 42, which is placed within the loop of the propagation medium 32, from where it excites the medium in both directions. Mirrors 34, 36, 38 and 40 serve to direct both beams to adjacent pieces of medium 32. An interference pattern detector (interferometer) 44 serves to detect the interference pattern between the two beams.

As the system rotates about an axis going through its center, the two counter propagating beams undergo the Sagnac effect. In the RLG apparatus the phase difference between the beams occurs in a cumulative manner every time the beam traverses the medium. This in turn creates a frequency difference between the two beams, as predicted by:

$$\Delta f = \frac{4A\omega_{rot}}{\lambda P} \quad (2)$$

Where A denotes the loop area, $\omega_{rot}$ denotes the rotation angular velocity, $\lambda$ denotes the laser wavelength and P denotes the optical path length, which is defined as $\oint n dx$, where n is the refractive index in the medium and the integral is taken over the entire length of the medium.

This frequency shift (or frequency splitting) creates a moving standing wave in the medium as a combination of two waves with nulls that change position with respect to the detector. Because of the highly discernible frequency shift experienced in the RLG system, it alleviates the need for the lengthy medium required in the FOG system, but it is still relatively large and expensive due to its reliance on a fully functional laser.

The most prevalent technology in gyroscope sensors in mobile devices is based on micro-electro-mechanical systems (MEMS), in which vibrating microscopic elements sense rotation by detecting tiny displacements caused by the Coriolis forces associated with the rotational movement of the device.

While MEMS based gyroscopes may be miniaturized, they have several disadvantages. One disadvantage is the Brownian noise in the vibrating elements causes the system noise floor to be relatively high. Typically, this noise requires filtering with a low-frequency pole (equivalent to long-term averaging), which introduces latency. This could result in a sluggish response that may be insufficient for gaming or other applications where a fast response is needed. Additionally, MEMS based gyroscopes are inherently sensitive to acoustic vibrations whose impact on the MEMS sensors may appear similar to the Coriolis forces they are intended to measure. Furthermore, the manufacturing of MEMS devices is expensive since it requires special fabrication processes and packaging that differ from those of standard low-cost CMOS digital integrated circuits and packaging. Since the circuits used for controlling these sensors and detecting and processing the movement are typically implemented in a standard CMOS die, the MEMS based gyroscope component is an expensive multi-die system.

Figure 3:
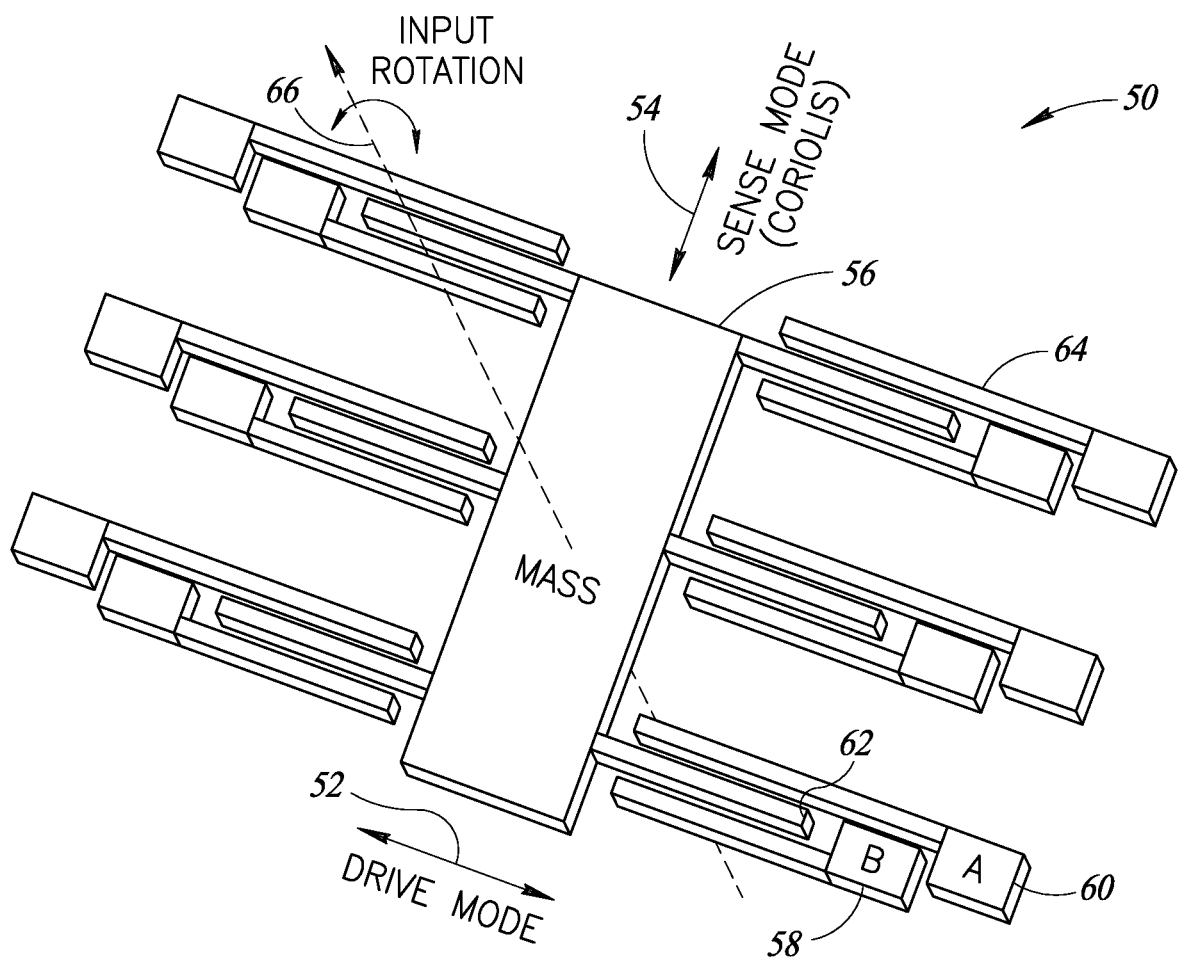
FIG. 3 is an illustration of a gyroscopic sensor based on micro-electromechanical systems (MEMS)

Another approach for realizing a gyroscope function is shown in FIG. 3. The gyroscope, generally referenced 50, comprises sensors, based on micro-electro-mechanical systems (MEMS), which are used to convert movement to changes in capacitance that are detected by an appropriate electronic circuit.

MEMS gyroscopes are elements (proof-mass) that vibrate in a certain direction. When rotated about an axis perpendicular to the vibration direction, a corresponding Coriolis force is created, which potentially moves the masses in a third direction perpendicular to both the vibration direction and the rotation direction.

With reference to FIG. 3, the principle of operation of a MEMS based gyroscope may be explained as follows. A mass 56 is suspended and vibrated in the drive mode axis 52. The mass is tied to a set of capacitive fingers 64, which sense movement along the sense mode axis 54. A rotation about the rotational axis 66 will cause a Coriolis force to act upon the mass, which would shift it in the sense mode direction 54, thereby perturbing the capacitance of capacitive fingers 64. For each capacitive finger there is a center tap tied to the mass (e.g., 62) between two electrodes A and B (i.e. 60 and 58, respectively).

Figure 4:
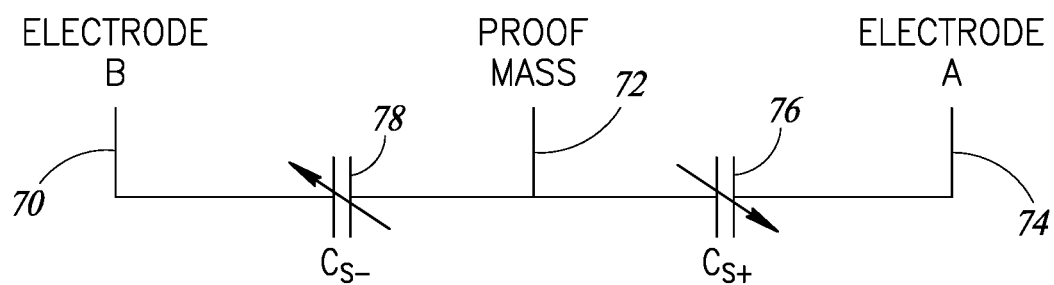
FIG. 4 is schematic diagram illustrating an equivalent electrical circuit of the gyroscopic sensor of FIG. 3.

An equivalent electrical circuit is shown in FIG. 4. The center tap tied to the proof mass 72 forms an equivalent capacitance 76 to electrode A 74 as well as an equivalent capacitance 78 to electrode B 70. When the proof mass is moved due to the Coriolis force in the sense mode direction 54, the effective capacitances of capacitors 76 and 78 would vary accordingly, thus indicating the extent of the equivalent force and hence the equivalent rotation speed of the sensor around rotation axis 66. The use of multiple systems of this type in conjunction with a processing unit may comprise a gyroscope that can extract general three-dimensional movement.

The major disadvantages of MEMS gyroscopes, as previously mentioned, are related with the relatively high levels of Brownian noise experienced in them, high acoustic sensitivity, excessive latencies associated with the necessary filtering of noise and difficulty in integrating such mechanism at low cost.

Electronic Gyroscope Using Pulsed Excitation

The present invention offers a solution for a fully electronic gyroscope that does not involve MEMS or any other moving parts and may be realized at low cost in an integrated circuit (IC). The apparatus of the present invention replaces the optical carrier used in the aforementioned prior art systems that are based on the Sagnac effect with a radio frequency (RF) signal that may be generated at low cost and the optical medium with circuit elements that comprise an RF transmission media through which the RF signal may propagate in both directions simultaneously.

In one embodiment of the present invention, radio frequency signals are used in place of an optical carrier and a transmission line loop is used for the radio signals to propagate in the two opposite directions, potentially experiencing different propagation characteristics as the loop undergoes rotation around its axis. These differences are detected by means of a switch matrix and supporting circuitry used to distinguish between the signals propagating in the two different directions in the loop and circuitry and signal processing algorithms that quantify the movement experienced in a particular dimension. Three such loops positioned perpendicularly serve to extract general three dimensional rotational movement.

Figure 5:
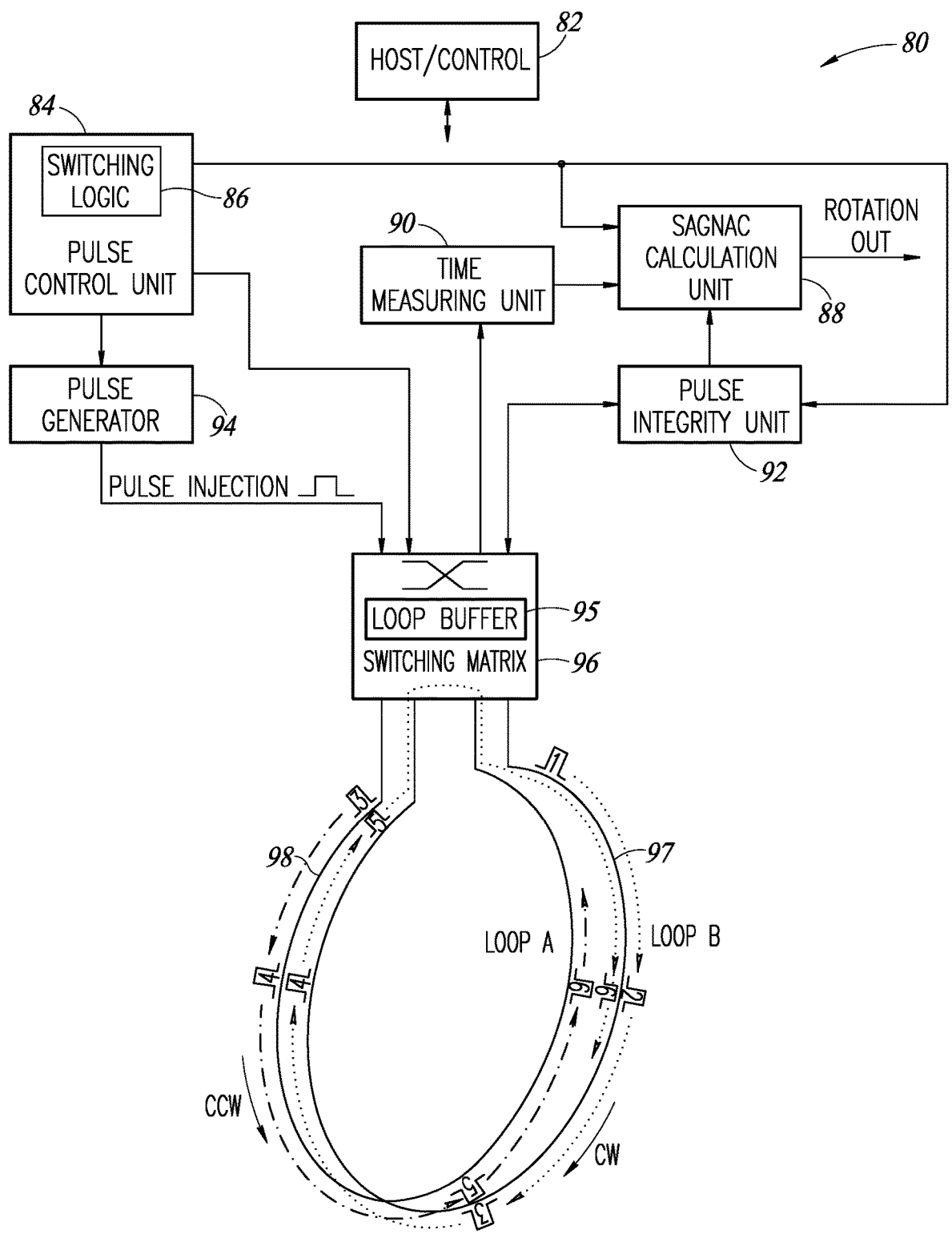
FIG. 5 is a block diagram illustrating a first example gyroscopic sensor that exploits the Sagnac effect in propagating RF signals that incorporates two loops and also illustrates the pulses traveling in clockwise and counterclockwise directions at different instances in time.

A block diagram illustrating a first example gyroscopic sensor device that exploits the Sagnac effect in propagating RF signals that incorporates two loops and also illustrates the pulses traveling in clockwise and counterclockwise directions at different instances in time is shown in FIG. 5. The fully electronic gyroscope sensor device, generally referenced 80, comprises two electrically conductive loops located on top of each other, namely loop A 98 and loop B 97, coupled to switching matrix 96 consisting of switches and a loop buffer 95 for sampling and amplification. The sensor 80 also comprises a host/control circuit 82, pulse control unit (PCU) 84 that includes switching logic 86, pulse generator 94, pulse integrity unit (PIU) 92, time measuring unit (TMU) 90, and Sagnac calculation unit (SCU) 88.

In operation, the device generates and sends signals (e.g., pulses, wavelets, etc.) in clockwise (CW) and counter clockwise (CCW) directions around one or more loops. The transit times of the counter propagating pulses are intermittently or continuously measured by various means to extract the Sagnac effect and calculate the mechanical rotation of the device. One of the key advantages of the invention is that a single signal path can be time multiplexed to avoid injection locking as is inherent in continuous wave prior art solutions. Another advantage of using time limited signals is that any reflections due to impedance mismatch or switching will occur during windows of time such that their impact on the phase or frequency of the CW and CCW signals is avoided.

In one embodiment, the CW and CCW signals are interleaved in time to enable both pulses to travel through the same circuit elements and devices and the same states of the devices giving the pulses sufficiently perfect symmetry. Consider, for example, that the CW pulse enters pin 1 of an IC and exits pin 2, then the CCW pulse path will follow these same pins in either the same or opposite direction, i.e. entering through pin 2 and exiting via pin 1. This symmetry ensures that any drift incurred by passing through circuit elements or a device in the signal path is applied equally to both CW and CCW signals. This serves to minimize any direction drift imperfection due to circuitry, device or device path mismatch and allows for the subtle Sagnac effect to be reliably detected. Similarly, the symmetry ensures that random or deterministic jitter will impact the CW and CCW signals equally when time averaged and not overshadow the Sagnac effect.

In one embodiment, the loops are implemented as passive RF transmission media examples of which include coaxial cables, transmission lines including stripline, microstrip, coplanar waveguide, etc., waveguides. Note that the RF transmission media may be either single ended or differential. In addition, the RF transmission media may be fabricated on an integrated circuit (IC) substrate, an IC package, or a printed circuit board (PCB).

Figure 9:
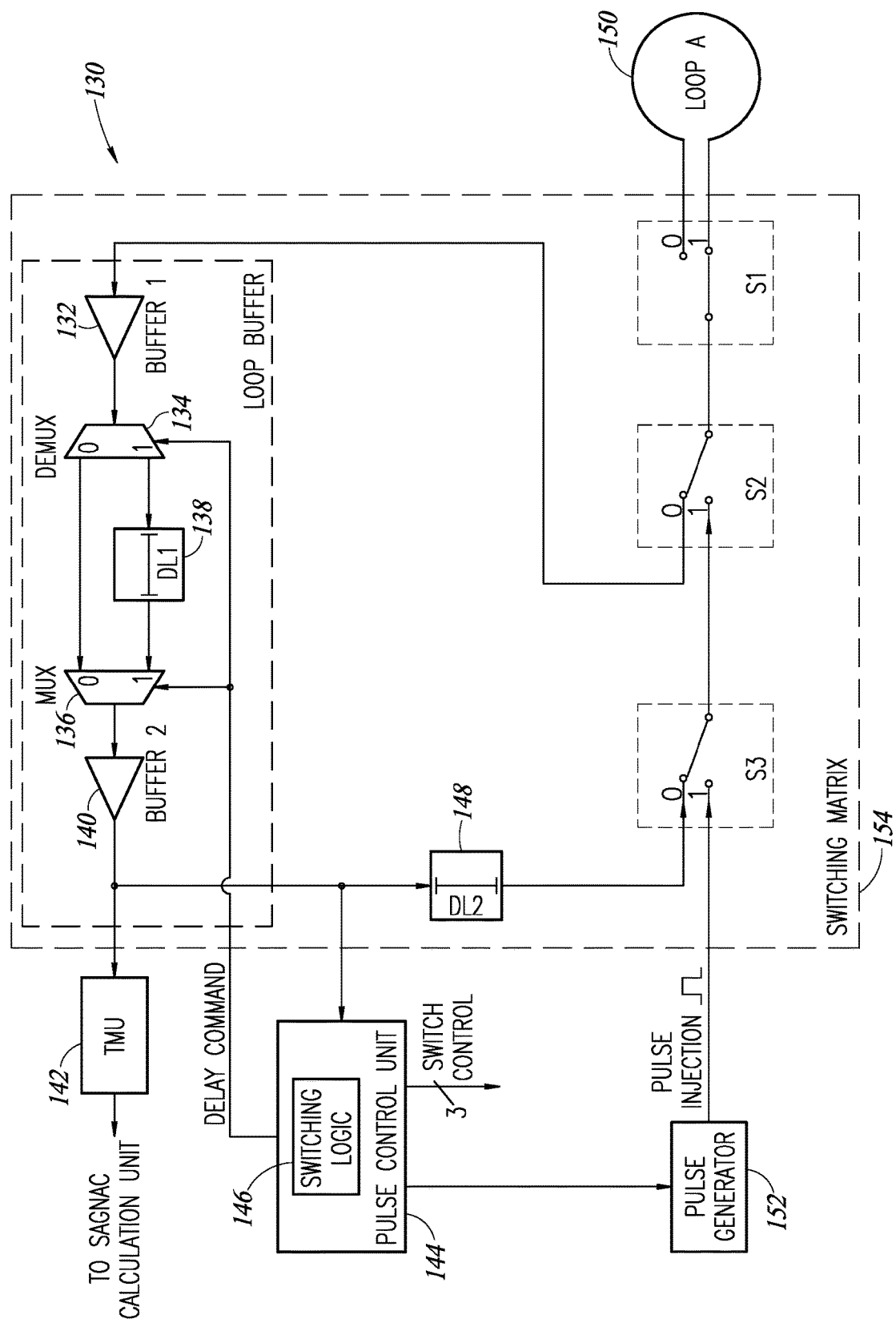
FIG. 9 is a block diagram illustrating a third example gyroscopic sensor that incorporates a single loop and that exploits the Sagnac effect in propagating RF signals.

It is appreciated that although two loops are shown in the example embodiment of FIG. 5, the sensor device may be constructed using a single RF transmission loop, where the pulses are injected at different times in counter propagating directions. An example of a sensor device using a single RF transmission loop is shown in FIG. 9, described in more detail infra.

The pulse generator 94 functions to generate pulses that are injected into the loops. The pulses may comprise narrow pulses, continuous wave modulated pulses, pulse trains, coded pulses, amplitude modulated (AM) pulses, frequency modulated (FM) pulses, chirp pulses, and pulse width modulated (PWM) pulses. In one embodiment, the pulses are narrow pulses whose duration is substantially shorter than the propagation delay of the RF loop.

The pulse control unit (PCU) 84 functions to control the generation of pulses by the pulse generator 94. It also includes switching logic 86 that functions to control the operation of the switching matrix 96 and loop buffer 95.

In one embodiment, the switching matrix 96 comprises a set of switches and one or more loop buffers 95 containing amplifiers that perform several functions in response to command signals from the PCU 84, PIU 92, and host/control 82. The functions performed by the switching matrix include (1) injecting pulses from the pulse generator into either loop A or B in either the CW or CCW direction; (2) sampling the voltage or current signal at the output of either loop A or B; (3) amplifying the sampled signal and redirecting the amplified signal into either loop A or loop B in either the CW or CCW direction; (4) outputting (concurrently to other operations) the sampled signal to the time measurement unit (TMU) 90 and/or to the pulse integrity unit (PIU) 92; and (5)

introducing an intentional time delay for one or more pulses propagating in a particular direction.

In one embodiment, the switching matrix functions to keep the signals propagating in the loops alive by sampling the signals in one of the RF transmission loops, amplifying the signal, and redirecting the signal into an alternate RF transmission loop (assuming there are at least two loops).

The time measurement unit (TMU) 90 functions to measure the differential time delay incurred to the counter propagating pulses due to the Sagnac effect. This can be achieved by one or a combination of any number of accurate time measurement techniques such as time to digital converter (TDC), linear or Vernier based, phase detection through mixing and averaging of square or signed waves, demodulation using a local oscillator, and/or pulse counting with a local clock as reference. A commercially available TDC integrated circuit suitable for use with the present invention is the THS788 manufactured by Texas Instruments Inc, Dallas, Tex., USA.

In one embodiment, the pulse integrity unit (PIU) 92 functions to (1) maintain the pulses propagating in the loops in a constant shape (i.e. constant pulse width); and (2) control the drift between the pulses.

Since the pulses are amplified and redirected many times over, their signals may suffer widening or narrowing due to jitter, threshold imperfections in the amplifier, input offsets, etc. The PIU employs well-known duty cycle/pulse width measurement and correction techniques to overcome the widening or narrowing of the pulses. In addition, control over the pulse width/duty cycle may utilize several well-known techniques such as closing a loop to control the amplifier threshold through a DAC, changing the DC bias on a differential line through a DAC, using "one-shot" regeneration of the pulses based on received pulses.

Note that any number of well-known techniques may be used to measure the duty cycle or width of the pulses such as low pass filtering (i.e. averaging) and sampling, using a TDC circuit or a delay line to measure the pulse width, etc.

Drift between the propagating pulses cannot be avoided. The drift between pulses, with respect to the original injected time difference, is due to either the Sagnac effect or unintentional artifacts such as directional mismatches, various accumulated time jitter, etc. If the drift is allowed to accumulate sufficiently, the signals may reach a dead zone (i.e. non-feasible zone) where the switching logic needs to amplify both counter propagating pulses at the same time. Therefore, in order to keep the pulses out of this dead zone, the PIU tracks the time difference between the pulses in both directions and initiates known corrections (i.e. injected intentional time delay) at a certain rate. This correction can be implemented using a switchable delay line within the switching matrix (not shown).

The Sagnac calculation unit (SCU) 88 is a circuit designed to compute the mechanical rate of rotation from the arrival time differences between the counter propagating pulses as measured by the TMU taking into account any intentional delays that may have been introduced by the switching matrix upon commands from the PIU and any additional calibrations that may be performed at the time of manufacture or dynamically during operation.

It is appreciated that with proper operation of the switching matrix identical functionality of the gyroscope sensor device can be achieved using either a single RF transmission loop or two or more loops.

Initialization and Operation

FIG. 5 depicts a schematic drawing of the signal initialization phase. The host/control 82 and PCU 84 control the operation of the circuit. During initialization, the PCU instructs the pulse generator 94 to generate two pulses at staggered times t1 and t3 that are then injected into the loops in the CW and CCW directions. The t1 pulse, indicated by a solid pulse and dotted path arrows, is injected into loop B and propagates in the CW direction. The t3 pulse, indicated by a dotted pulse and solid path arrows, is injected into loop A and propagates in the CCW direction. In one embodiment, an optional third pulse is injected that traverses both CW and CCW directions and is used for compensation.

Figure 6:
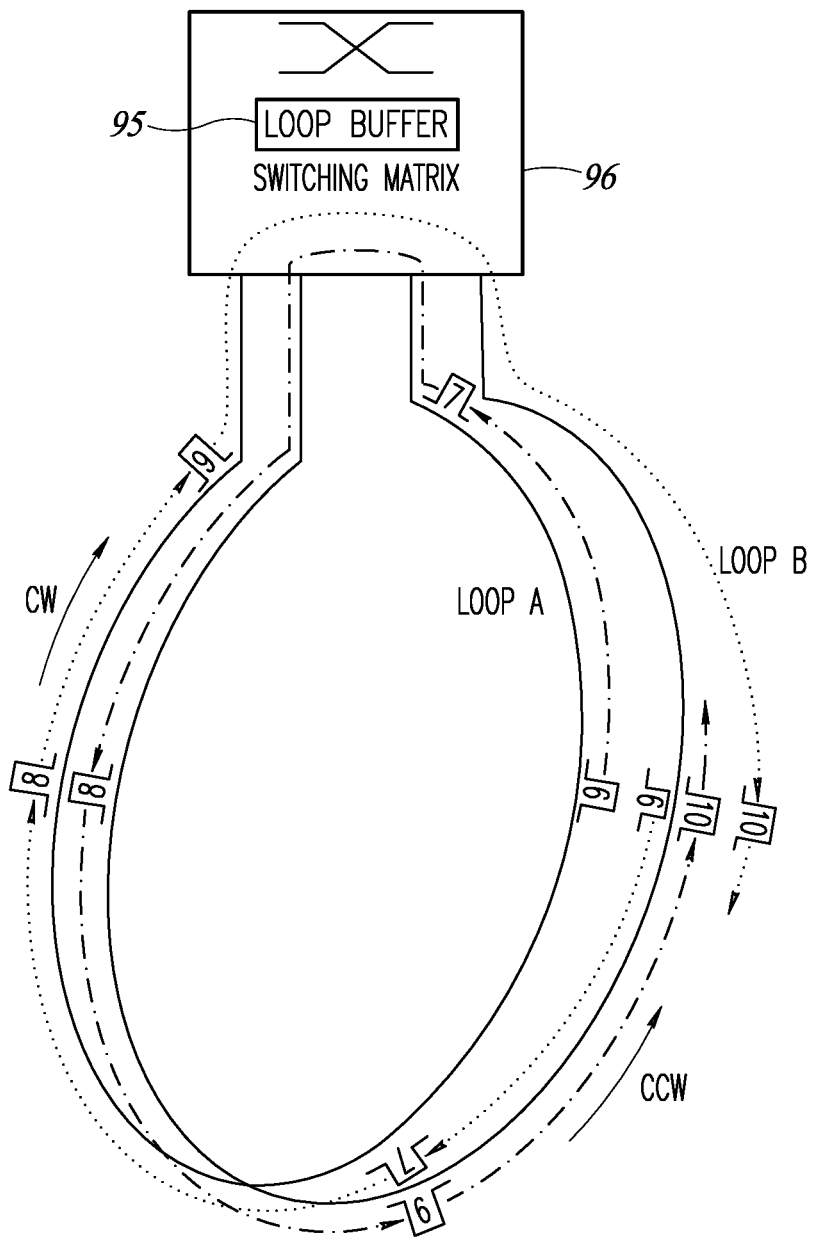
FIG. 6 is a block diagram illustrating the example gyroscopic sensor of FIG. 5 and showing additional pulses traveling in clockwise and counterclockwise directions at different instances in time.
Figure 7:
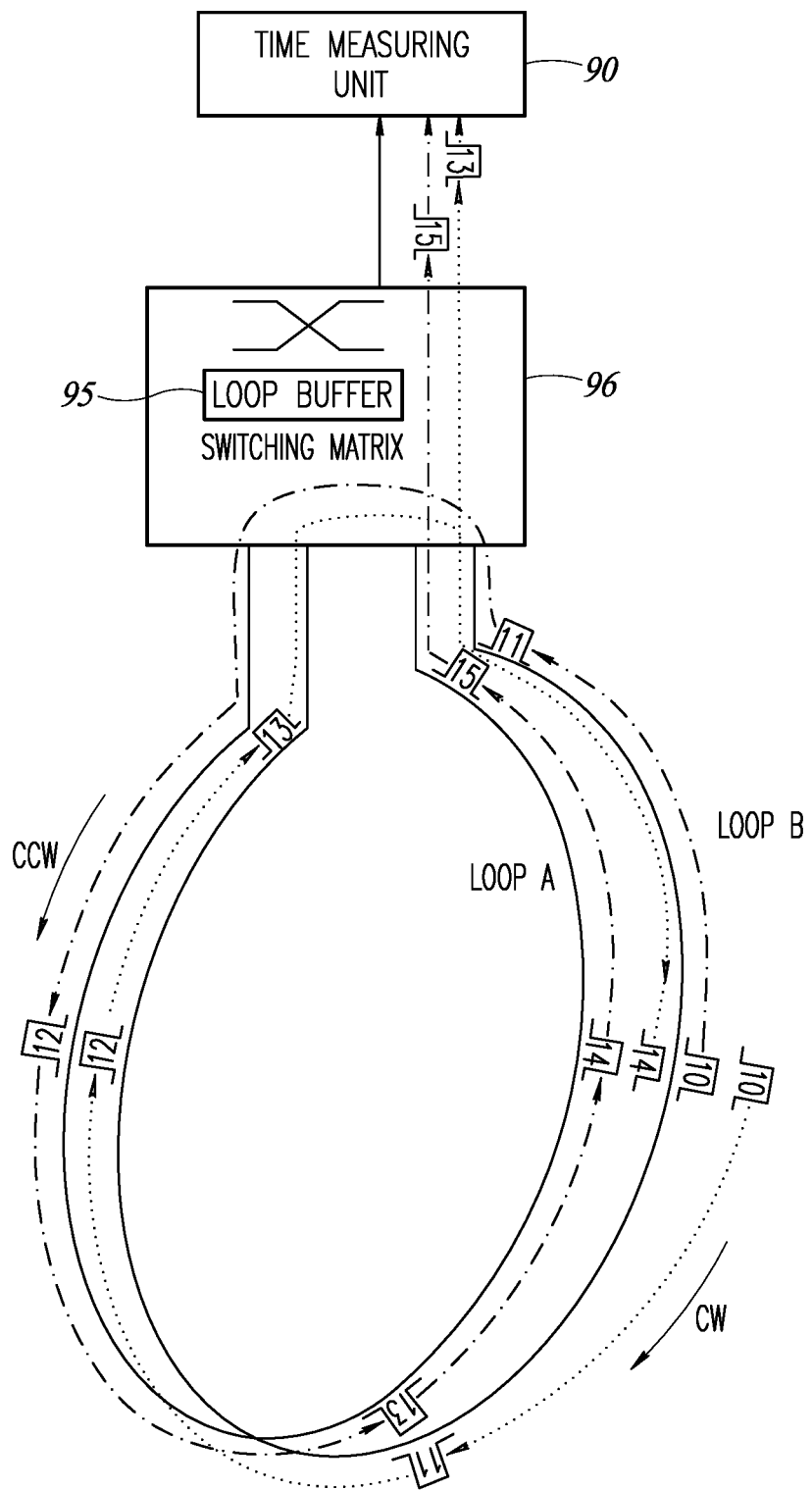
FIG. 7 is a block diagram illustrating the example gyroscopic sensor of FIG. 5 and showing additional pulses traveling in clockwise and counterclockwise directions at different instances in time and also entering the time measuring unit (TMU)

Note that the numbers within the pulses shown propagating around loops A and B in FIGS. 5, 6, and 7 are intended to indicate time labels. Thus, the pulse generated at t1 propagates in the CW direction around loop B. After it has reached some distance within the loop (roughly half loop in FIG. 5) the pulse generator is operative to generate a second pulse at time t3 which is injected into loop A such that it propagates in the CCW (i.e. opposite) direction to the pulse injected into loop B. Note that counter propagating pulses traveling around loops A and B cross each other every half loop, e.g., at time t4, t6, t8 and so on. The example pulses shown through time t15 are shown for illustration purposes and are split across several Figures for clarity purposes only.

In is important to note that at time t13, the CW pulse propagating in loop B reaches the switching matrix 96 and is sampled from the loop, amplified, and directed into loop A in the CW (i.e. opposite) direction. It is also input to the TMU 90 for measurement purposes. Similarly, at time t15, the CCW pulse originally injected into loop A reaches the switching matrix, is sampled, amplified, and redirected into loop B in the CCW direction as well as being input to the TMU.

This operation continues in the manner described above as long as the control logic and PIU determines it possible based on a predetermined set of criteria. Such criteria may involve resetting the loop at a constant rate (e.g., 50 times/sec), determining when the loop signal integrity has gone out of bounds (i.e. the pulse width is larger than or smaller than a threshold), the difference between the pulse width is too large, etc. Note that the sensitivity/performance of the loop is better the longer the longevity time of the pulses within the loop.

Switching Matrix Modes of Operation and Loop Buffer

Figure 8:
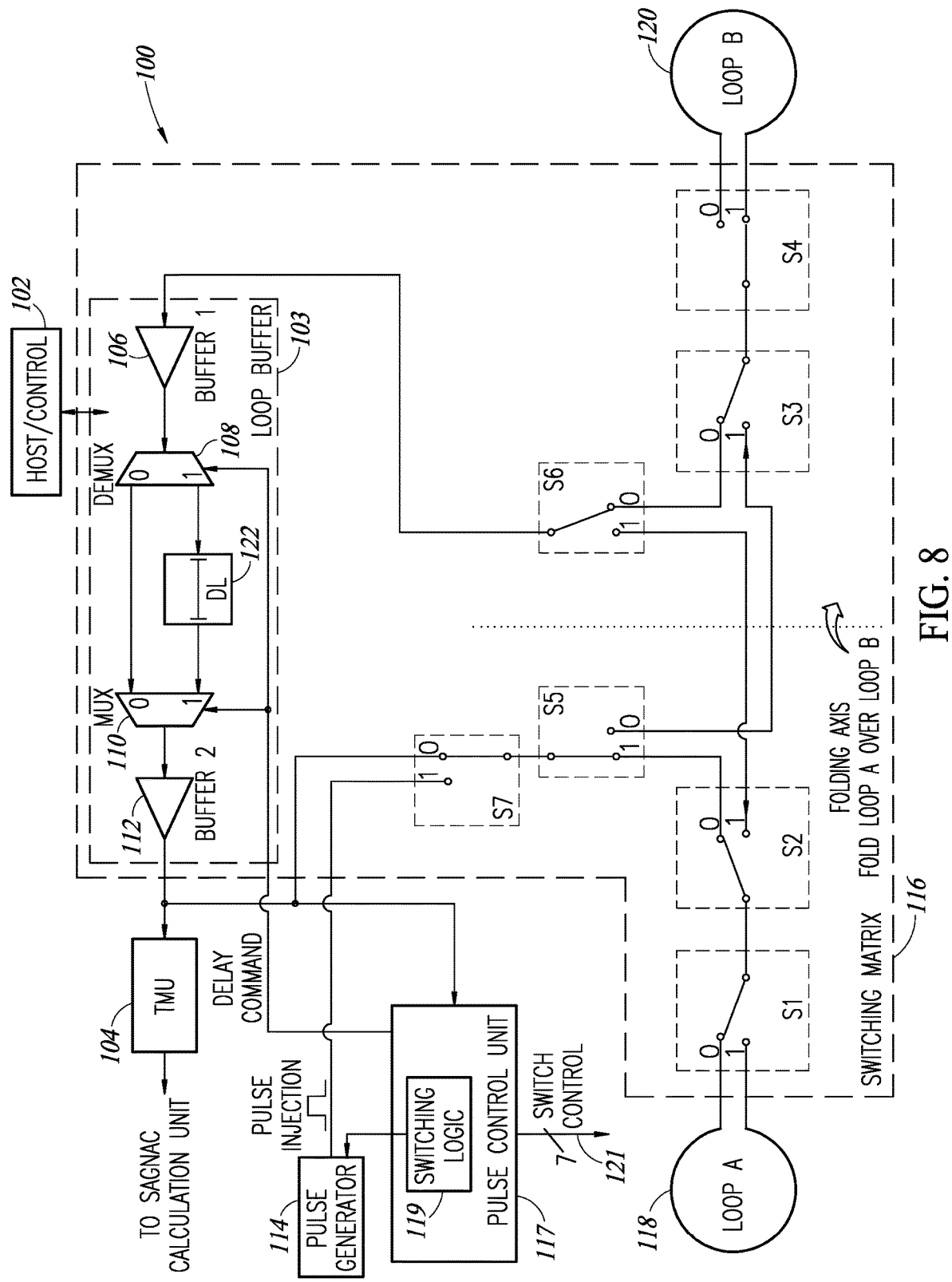
FIG. 8 is a block diagram illustrating a second example gyroscopic sensor that that incorporates two loops and exploits the Sagnac effect in propagating RF signals and shows the switching matrix in more detail.

A block diagram illustrating a second example gyroscopic sensor that that incorporates two loops and exploits the Sagnac effect in propagating RF signals and shows the switching matrix and loop buffer in more detail is shown in FIG. 8. In one embodiment, the signal path includes in the sensor device includes seven single pole, double throw (SPDT) switches, multiplexing circuits, and two nonlinear amplifiers (i.e. buffers). The sensor device, generally referenced 100, comprises a host/control 102, loop buffer (LB) circuit 103, TMU 104, Sagnac calculation unit (SCU) (not shown), switching matrix 116, pulse generator 114, PCU 117 including switching logic 119, and loops A 118 and B 120.

The loop buffer 103 comprises nonlinear amplifier (buffer 1) 106, demux 108, delay line 122, mux 110, and buffer 2 112. By appropriate control via delay command signal from the PCU, the demux 108 and mux 110 are configured to delay the amplified pulse via delay line 122 or pass the amplified pulse without any delay back to the opposite loop.

Figure 11:
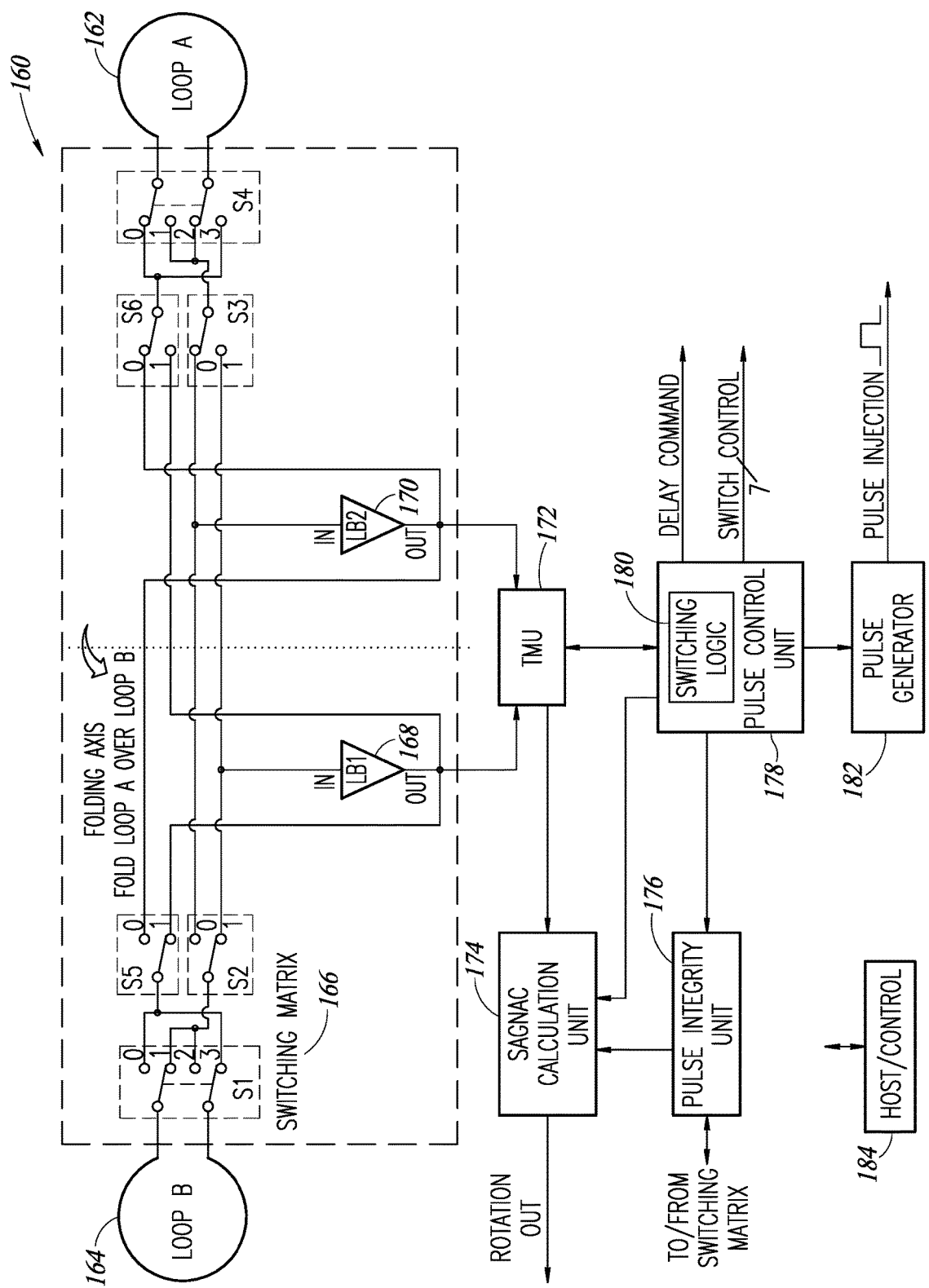
FIG. 11 is a block diagram illustrating a fourth example gyroscopic sensor that incorporates two loops and two loop buffers and that exploits the Sagnac effect in propagating RF signals.
Figure 12:
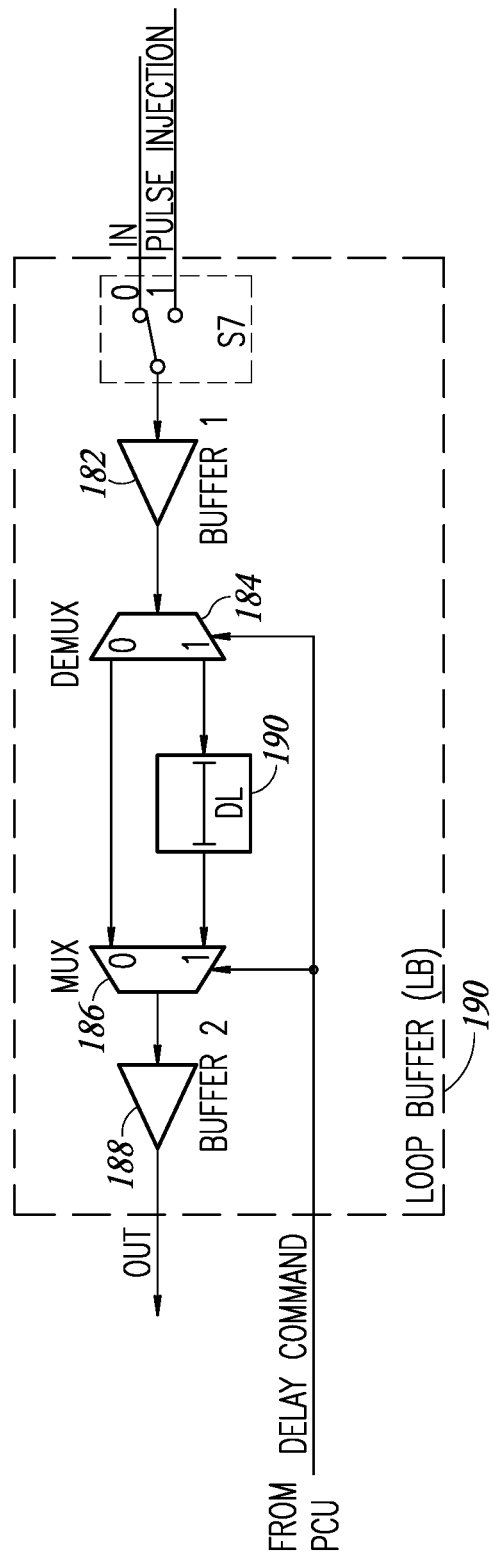
FIG. 12 is a block diagram illustrating the loop buffer circuit of FIG. 11 in more detail.

The switching matrix 116 comprises a plurality of single pole, double throw (SPDT) switches, namely S1 through S7, that control the path of the pulses between the two loops, loop buffer, and pulse generator. It is appreciated by one skilled in the art, that the same circuit functionality can be implemented using an additional loop buffer and a reduced number of switches as shown in FIGS. 11 and 12, described in more detail infra.

Note that loops A 118 and B 120, are drawn in diametrically opposite locations with respect to the switching matrix for clarity sake. In this figure, loop A is imagined to be folded on top of (or below) loop B to match the directions described below.

In one embodiment, the switching matrix 116 circuit has six applicable modes of operation as follows: (1) injection of a CW pulse from the pulse generator into loop B; (2) injection of a CCW pulse from the pulse generator into loop A; (3) redirection of the CW pulse from loop B into loop A; (4) redirection of the CCW pulse from loop A into loop B; (5) redirection of the CW pulse from loop A into loop B; and (6) redirection of the CCW pulse from loop B into loop A.

The switching logic 119 in the PCU functions to performing the logical operations to control the switches in the switching matrix 116 via switch control lines 121. In one embodiment, the switching logic is triggered by the output of buffer 2. Note that the inherent time delay is sufficient for the pulses to start propagating in the loops and also sufficient to control the switches.

Table 1 presented below outlines the switch positions for each of the six modes described supra. An 'X' denotes a don't care position where the number in parenthesis after the X indicates a suggested switch position to minimize switching frequency. Note that as indicated in Table 1, all switches can be made to operate once or twice every time interval between injected pulses. Since this interval typically amounts to half the loop propagation delay, the switches will thus only need to switch once every loop propagation delay.

2 140. By appropriate control via delay command signal from the PCU, the demux and mux are configured to delay the amplified pulse via delay line DL1 or pass the amplified pulse without any delay back to the opposite loop.

In this embodiment, the switching matrix 154 comprises a reduced number of SPDT switches, namely S1 through S3, that control the path of the pulses between the loop, loop buffer, delay line DL2, and pulse generator.

The operation of the gyroscope sensor device 130 is similar to that of the two loop segment device 100 (FIG. 8) described supra. Here, however, an additional and relatively large delay line DL2 functions to enable switch S2 to switch between the time the pulse entered the switch and was delivered onto the amplification path and the time it takes the pulse to propagate back into S2. Delay line DL2 is preferably tuned to have a delay longer than the switching time of S2, which may be a significant duration depending on the particular implementation.

Note that in this single loop embodiment, the switching logic 146 must control the configuration of the switches fast enough to prevent the pulses from reaching S3 before the switches have been configured (i.e. programmed) with their new positions.

Calibration Mode

Figure 10:
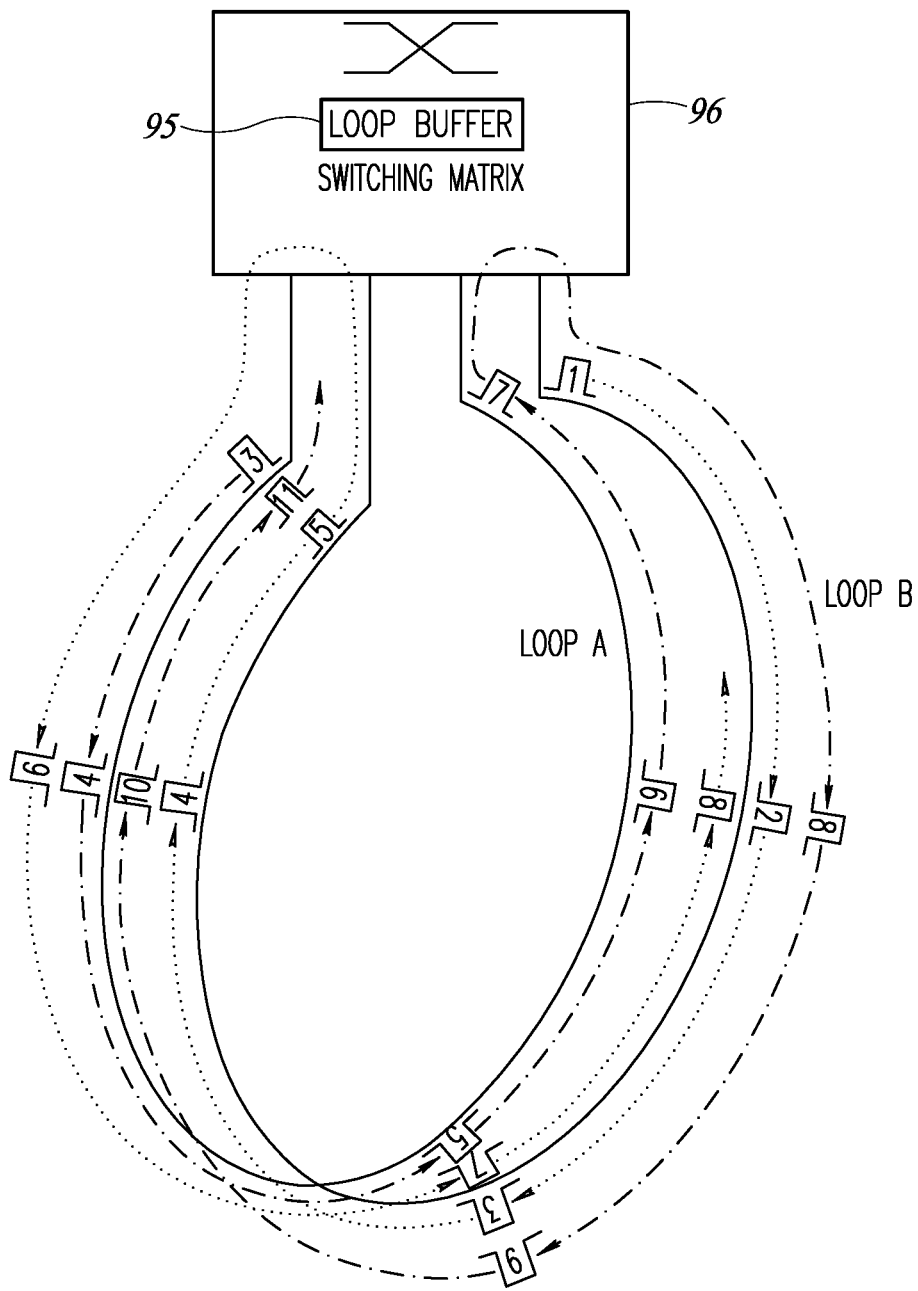
FIG. 10 is a block diagram illustrating pulses traveling in clockwise and counterclockwise directions at different instances in time for the example gyroscopic sensor of FIG. 5 during a calibration mode of operation.

A block diagram illustrating pulses traveling in clockwise and counterclockwise directions at different instances in time for the example gyroscopic sensor of FIG. 5 during a calibration mode of operation is shown in FIG. 10. In one embodiment, the system may be calibrated one time, upon startup, periodically, or as needed. The calibration mode operates by introducing counter rotating calibration pulses that propagate through the loop (or loops) in a way that

TABLE 1

| Switch positions during normal operation | | | | | | | | |
|---|---|---|---|---|---|---|---|---|
| Time Instance in FIGS. 5-7 | | S1 | S2 | S3 | S4 | S5 | S6 | S7 |
| t1 | Inject CW-->B | X(1) | X(0) | 1 | 0 | 0 | X(0) | 1 |
| t3 | Inject CCW-->A | 1 | 0 | X(0) | X(1) | 1 | X(0) | 1 |
| t5 | CW B-->A | 0 | 0 | 0 | 1 | 1 | 0 | 0 |
| t7 | CCW A-->B | 0 | 1 | 1 | 1 | 0 | 1 | 0 |
| t9 | CW A-->B | 1 | 1 | 1 | 0 | 0 | 1 | 0 |
| t11 | CCW B-->A | 1 | 0 | 0 | 0 | 1 | 0 | 0 |

In operation, switch S7 functions to inject the pulse output of the pulse generator into one of the loops depending on the position of switch S5. Switch S1 controls whether the pulse is injected into loop A in the CW or CCW direction. Similarly, switch S4 performs the same function for loop B. Switch S2 connects loop A to either the output or the input of the loop buffer. Switch S3 connects loop B to either the input or the output of the loop buffer.

A block diagram illustrating a third example gyroscopic sensor device that incorporates a single loop and that exploits the Sagnac effect in propagating RF signals is shown in FIG. 9. The sensor device, generally referenced 130, comprises a host/control (not shown), loop buffer (LB) circuit 131, TMU 142, Sagnac calculation unit (SCU) (not shown), switching matrix 154, pulse generator 152, PCU 144 including switching logic 146, delay line DL2 148, and loop A 150.

The loop buffer 131 comprises nonlinear amplifier (buffer 1) 132, demux 134, delay line DL1 138, mux 136, and buffer alternates between CW and CCW directions such that any physical Sagnac effect is canceled even if the device is undergoing mechanical rotation. This is performed by one pulse (Pulse1) running CW in Loop B and CCW in loop A and a second pulse (Pulse2) running CW in Loop A and CCW in Loop B. The time difference between Pulse1 and Pulse2 is measured with respect to each other. Any drift that is measured is compensated for by dynamically altering the loop length of the CW direction with respect to the CCW direction or by means of signal processing after measurement.

This correction circuit can be implemented using switches or other multiplexing devices that insert a fixed line length when the CW pulse passes through it and an alternate length when the CW pulse passes through it. Furthermore, the system may be continuously compensated by similar means or an ever present or intermittently present set of pulses that are introduced to travel in both CW and CCW directions while another pulse is always in the CW direction and a third pulse is always in the CCW direction.

The system measures the time difference between the pulses using the TMU in the same manner as in normal operation mode. Any drift that is calculated during the calibration mode is subtracted from the drift during the operational mode to yield a compensated zero rotation drift value that is significantly lower.

The calibration mode may be enabled periodically to counter the effects of temperature or physical strain on the RF transmission lines (i.e. from centrifugal forces) and may be used for measurements during subsequent normal operating mode.

An example of the pulses injected into and propagating through loops A and B is shown in FIG. 10. A pulse is injected into loop B at time t1 while a second pulse is injected into loop A at time t3. When the pulse in loop B reaches the end of the loop (time t5), rather than get injected to the other end of loop A, it is injected to the same end of loop A. Similarly, when the pulse in loop A reaches the end of the loop (time t7), rather than get injected to the other end of loop B, it is injected to the same end of loop B.

Table 2 below shows the switch positions used during calibration mode of the gyroscope sensor device.

TABLE 2

Switch positions during calibration

| Time Instance in FIG. 10 | | S1 | S2 | S3 | S4 | S5 | S6 | S7 |
|---|---|---|---|---|---|---|---|---|
| t1 | Inject CW-->B | X(0) | X(0) | 1 | 0 | 0 | X(0) | 1 |
| t3 | Inject CW-->A | 0 | 0 | X(0) | X(0) | 1 | X(0) | 1 |
| t5 | CW B --> CCW A | 1 | 0 | 0 | 1 | 1 | 0 | 0 |
| t7 | CW A --> CCW B | 1 | 1 | 1 | 1 | 0 | 1 | 0 |
| t9 | CCW A --> CW B | 0 | 1 | 1 | 0 | 0 | 1 | 0 |
| t11 | CCW B --> CW A | 0 | 0 | 0 | 0 | 1 | 0 | 0 |

As indicated in the table, the settings of only switches S1 and S4 during times t5, t7, t9, t11 change in calibration mode form their position in normal operating mode.

Gyroscope Sensor With Double Loop Buffers

A block diagram illustrating a fourth example gyroscopic sensor that incorporates two loops and two loop buffers and that exploits the Sagnac effect in propagating RF signals is shown in FIG. 11. A block diagram illustrating the loop buffer circuit of FIG. 11 in more detail is shown in FIG. 12. With reference to both FIGS. 11 and 12, the gyroscope sensor circuit, generally referenced 160, comprises two electrically conductive loops located on top of each other, namely loop A 162 and loop B 164, coupled to switching matrix 166 consisting of a plurality of switches S1 to S6 two loop buffers LB1 168, LB2 170 for sampling and amplification. The sensor 160 also comprises a host/control circuit 184, pulse control unit (PCU) 178 that includes switching logic 180, pulse generator 182, pulse integrity unit (PIU) 176, time measuring unit (TMU) 172, and Sagnac calculation unit (SCU) 174. Note that as in FIG. 8, the loops are drawn in diametrically opposite locations with respect to the switching matrix for clarity. Loop A is folded on top of or below loop B to match the directions in this description.

The operation of the gyroscope sensor 160 is similar to that of the gyroscope sensor of FIG. 8 with the difference being the addition of a second loop buffer circuit. In this alternative embodiment two loops are connected through a switching matrix to two buffers. The switching matrix comprises two double pole, double throw (DPDT) switches, namely S1 and S4, and four SPDT switches, namely S2, S3, S5, and S6.

Each loop buffer includes amplifiers that perform several functions in response to command signals from the PCU, PIU, and host/control. Each loop buffer 190 comprises a switch (S7) to select between either the output of one of the loops or the pulse injected from the pulse generator 182, nonlinear amplifier (buffer 1) 182, demux 184, delay line 190, mux 186, and buffer 2 188. By appropriate control via delay command signal from the PCU, the demux 184 and mux 186 circuits are configured to delay the amplified pulse via delay line 190 or pass the amplified pulse without any delay back to either loop.

In operation, the pulses are injected in opposite directions into loop B and loop A (e.g., CCW direction in loop B and CW direction in loop A) and the switches couple LB1 to loop B and LB2 to loop A in a closed loop. Therefore, a pulse circles each loop in counter rotating directions for a macroscopic time (i.e. multiple loop transitions) that may be static or dynamic (e.g., 1 ms). The sensor further comprises the TMU, which functions to count pulses and measures the difference in their arrival times. The switching logic in the PCU is operative to determine the switch controls that control the settings of the seven switches as well as generate the delay command for the delay line in the loop buffers. The PCU also determines the pulse positions and controls the pulse generator. The SCU functions to calculate the rotational speed of the loops in accordance with the time difference between pulses measured by the TMU.

In one embodiment, the switching matrix has four steady states and two transition states. The four steady states are able to propagate CW or CCW pulses in loops A and B while coupling either loop buffer LB1 or LB2 into each loop. The two transition states are operative to move pulses in either direction between the two loops, i.e. (1) the CW direction in loop B and the CCW direction in loop A to the CW direction in loop A and the CCW direction in loop B, or (2) the CCW direction in loop B and the CW direction in loop A to the CCW direction in loop A and the CW direction in loop B.

Table 3 below indicates the switch positions for each of the six states, including four steady states and two transition states.

TABLE 3

| | | | Switch positions during operation | | | | | | |
|---|---|---|---|---|---|---|---|---|---|
| | FIG. # | State # | State | S1 | S2 | S3 | S4 | S5 | S6 |
| Steady State | 13 | 1 | CCW - Loop B - LB1<br>CW - Loop A - LB2 | 0, 2 | 1 | 0 | 1, 3 | 1 | 0 |
| | 14 | 2 | CCW - Loop B - LB2<br>CW - Loop A - LB1 | 0, 2 | 0 | 1 | 1, 3 | 0 | 1 |
| | 15 | 3 | CCW - Loop A - LB2<br>CW - Loop B - LB1 | 1, 3 | 1 | 0 | 0, 2 | 1 | 0 |
| | 16 | 4 | CCW - Loop A - LB1<br>CW - Loop B - LB2 | 1, 3 | 0 | 1 | 0, 2 | 0 | 1 |
| Transition | 17 | 5 | CCW Loop B --> Loop A<br>CW Loop A --> Loop B | 0, 2 | 0 | 0 | 1, 3 | 1 | 1 |
| | 18 | 6 | CCW Loop A --> Loop B<br>CW Loop B --> Loop A | 1, 3 | 0 | 0 | 0, 2 | 1 | 1 |

Figure 13:
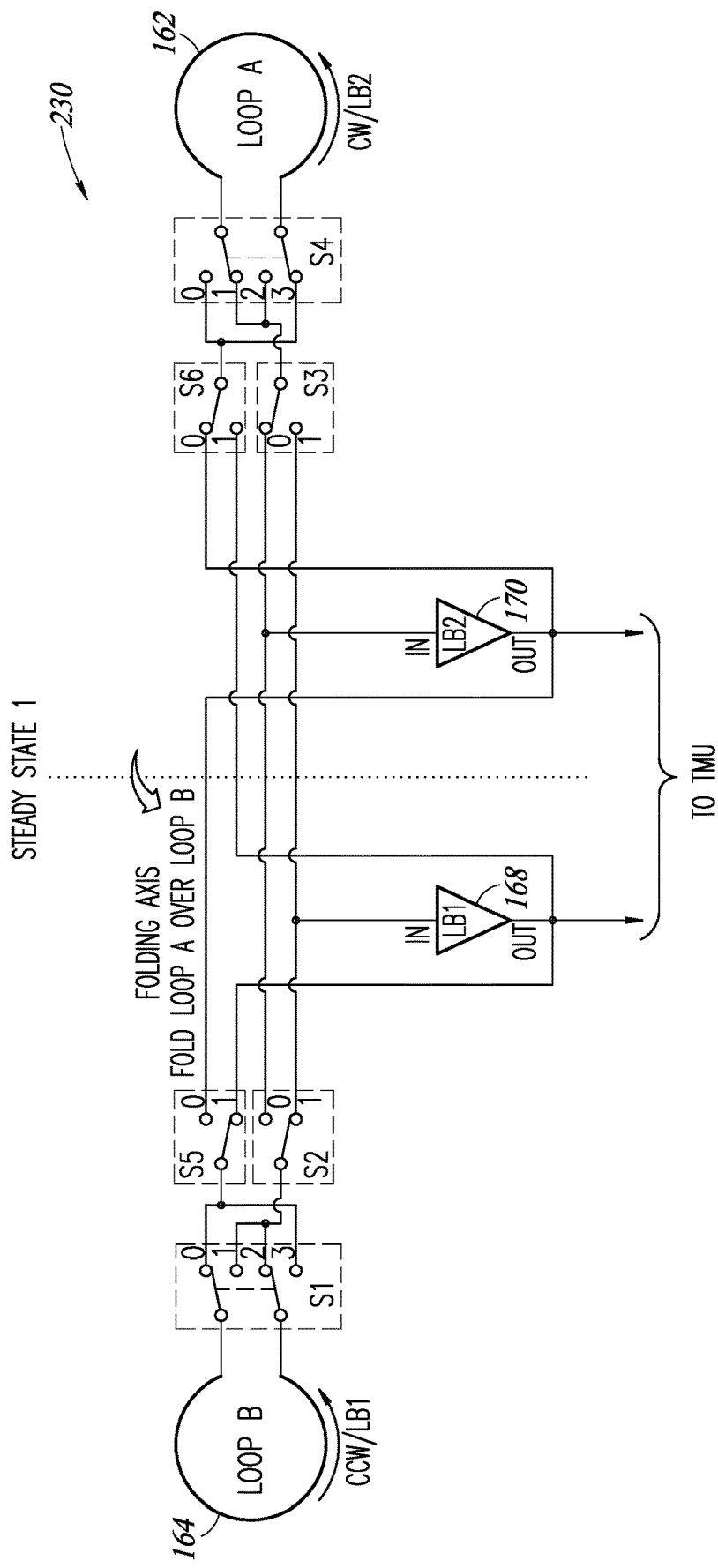
FIG. 13 is a diagram illustrating the configuration of the switching matrix during steady state 1.

A diagram illustrating the configuration of the switching matrix during steady state 1 is shown in FIG. 13. The configuration, generally referenced 230, shows DPDT switches S1, S4 and SPDT switches S2, S3, S5, and S6 configured to propagate the pulse through loop A in the CW direction and through loop buffer LB2, and to propagate the pulse through loop B in the CCW direction and through loop buffer LB1.

Figure 14:
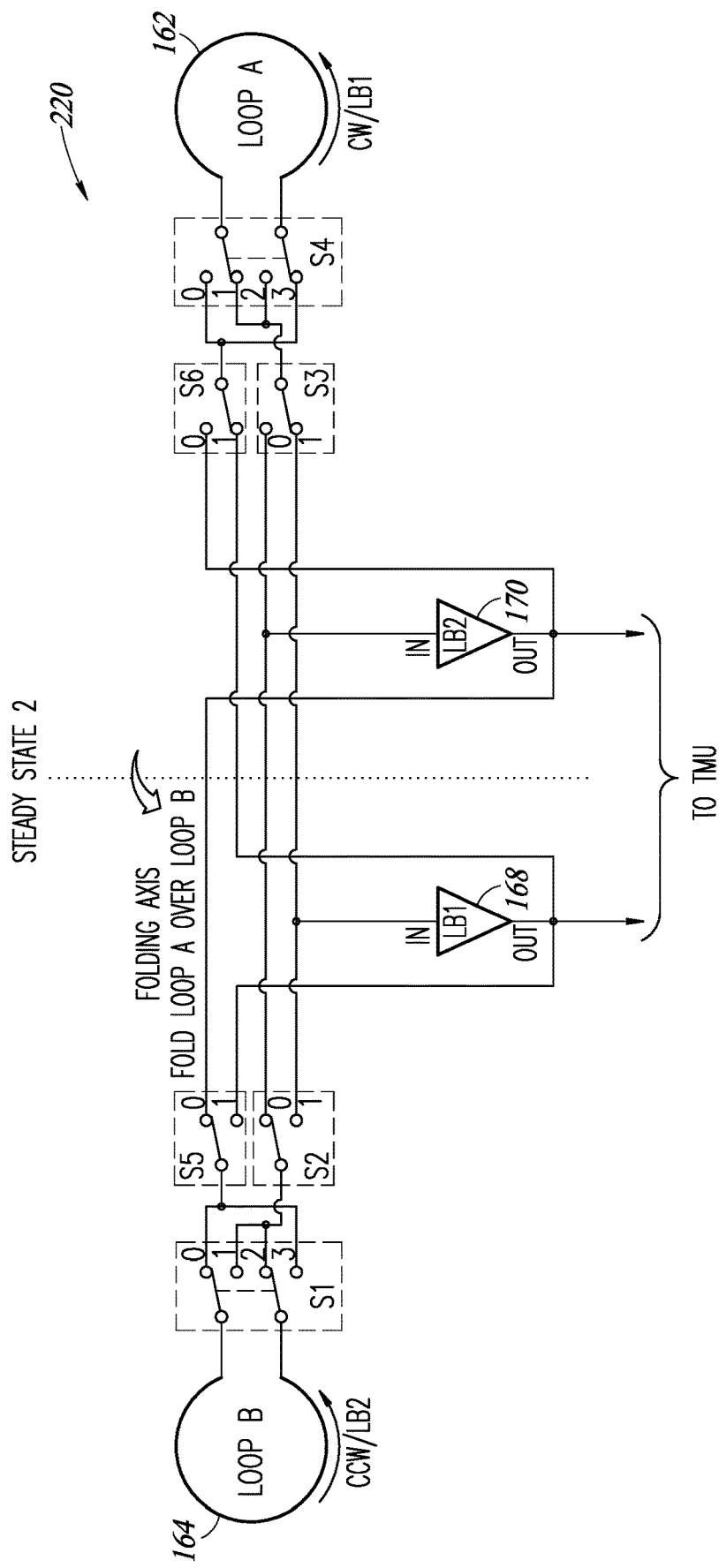
FIG. 14 is a diagram illustrating the configuration of the switching matrix during steady state 2.

A diagram illustrating the configuration of the switching matrix during steady state 2 is shown in FIG. 14. The configuration, generally referenced 220, shows DPDT switches S1, S4 and SPDT switches S2, S3, S5, and S6 configured to propagate the pulse through loop A in the CW direction and through loop buffer LB1, and to propagate the pulse through loop B in the CCW direction and through loop buffer LB2.

Figure 15:
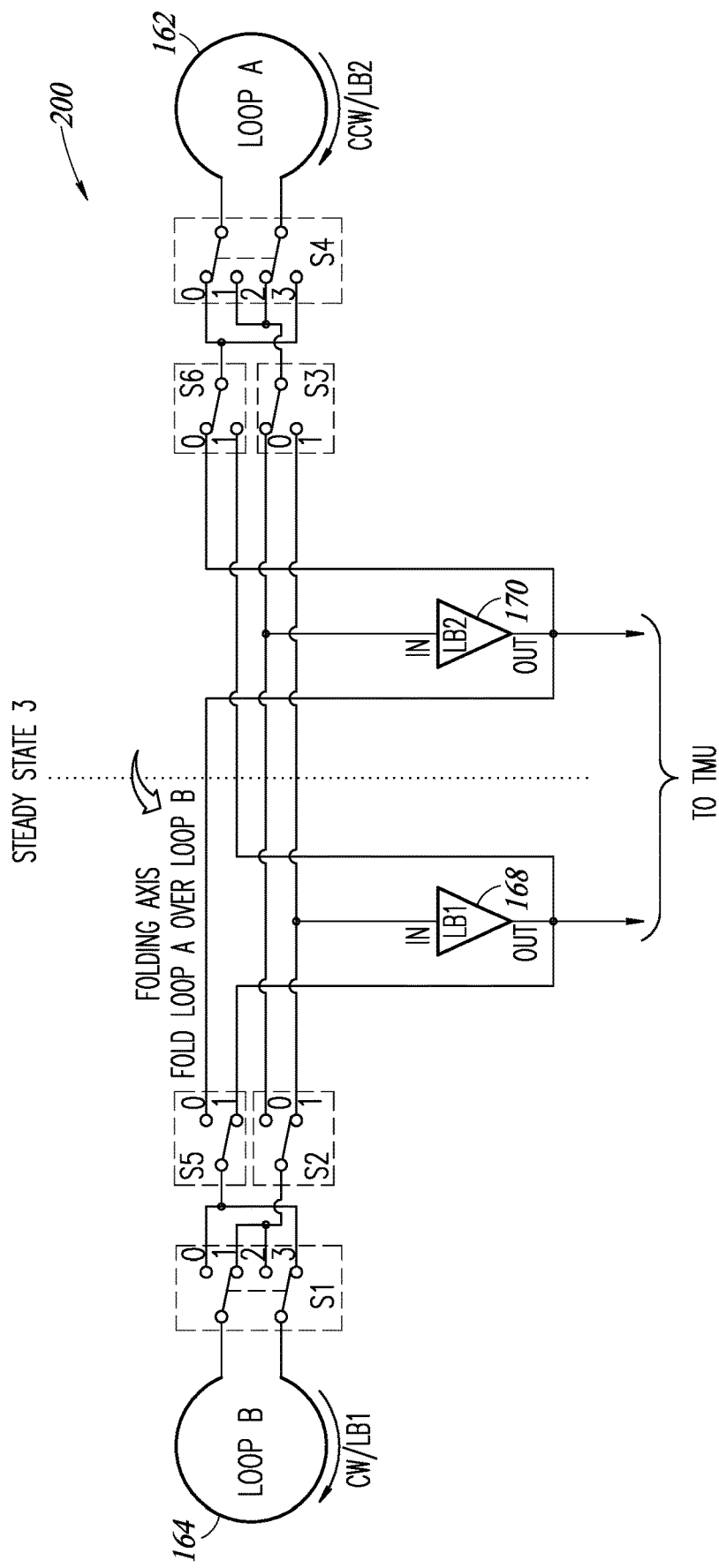
FIG. 15 is a diagram illustrating the configuration of the switching matrix during steady state 3.

A diagram illustrating the configuration of the switching matrix during steady state 3 is shown in FIG. 15. The configuration, generally referenced 200, shows DPDT switches S1, S4 and SPDT switches S2, S3, S5, and S6 configured to propagate the pulse through loop A in the CCW direction and through loop buffer LB2, and to propagate the pulse through loop B in the CW direction and through loop buffer LB1.

Figure 16:
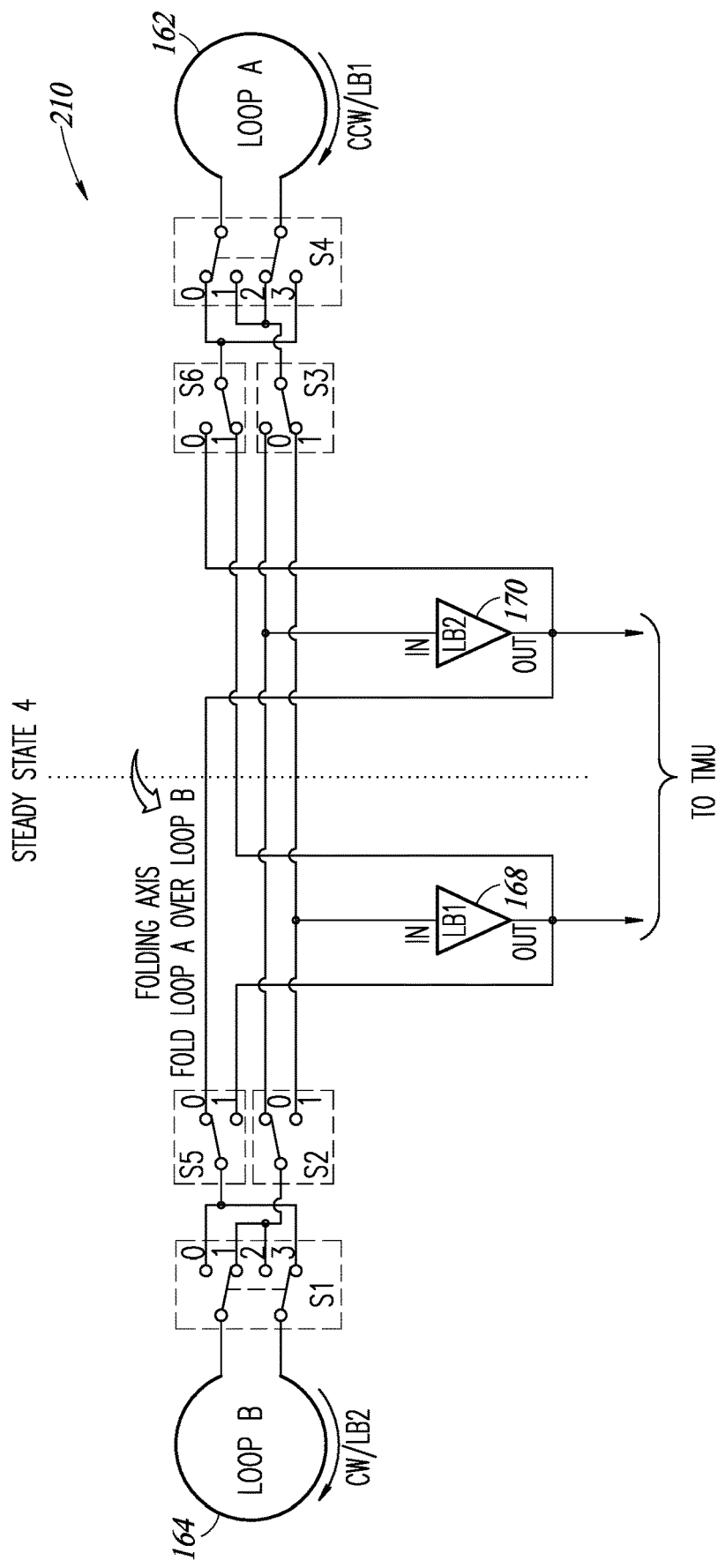
FIG. 16 is a diagram illustrating the configuration of the switching matrix during steady state 4.

A diagram illustrating the configuration of the switching matrix during steady state 4 is shown in FIG. 16. The configuration, generally referenced 210, shows DPDT switches S1, S4 and SPDT switches S2, S3, S5, and S6 configured to propagate the pulse through loop A in the CCW direction and through loop buffer LB1, and to propagate the pulse through loop B in the CW direction and through loop buffer LB2.

Figure 17:
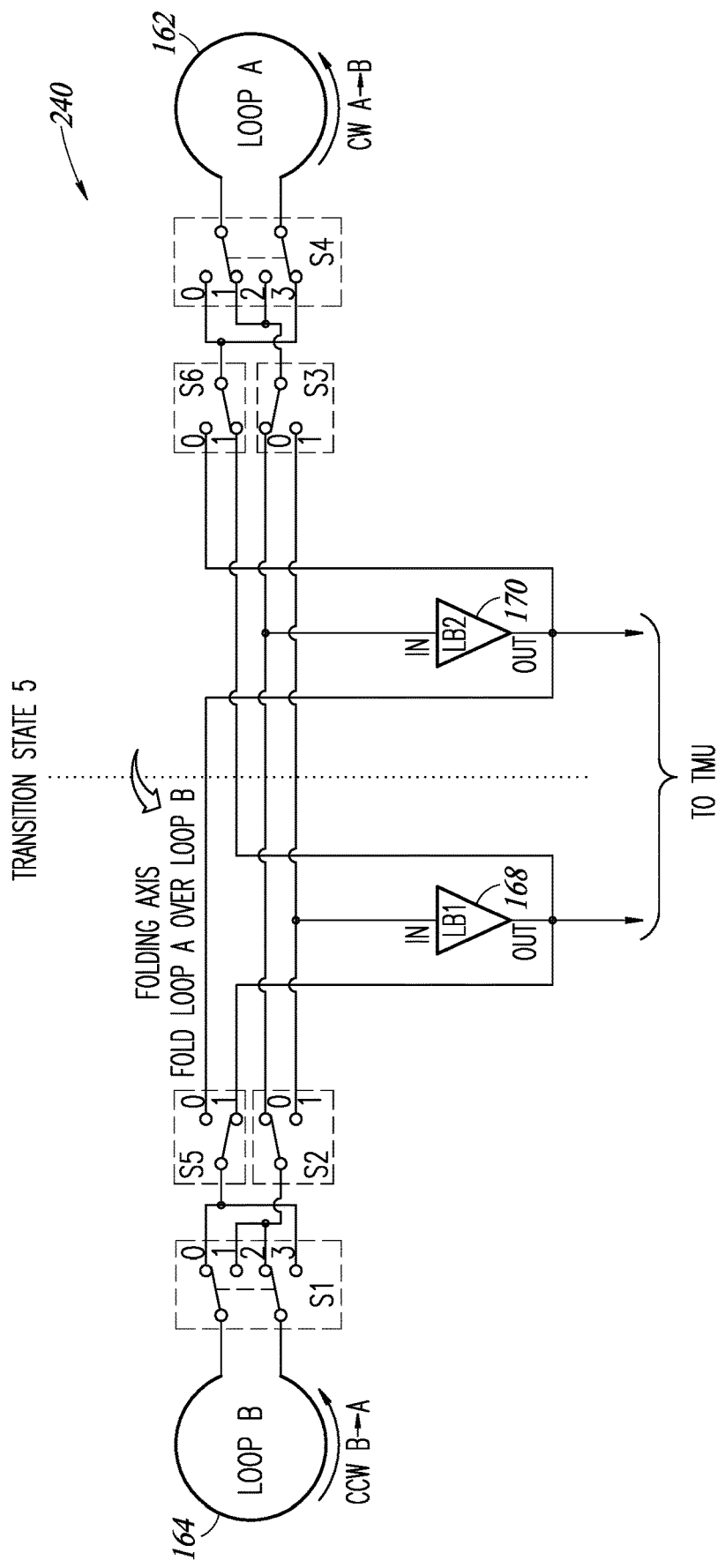
FIG. 17 is a diagram illustrating the configuration of the switching matrix during transition state 5.

A diagram illustrating the configuration of the switching matrix during transition state 5 is shown in FIG. 17. The configuration, generally referenced 240, shows DPDT switches S1, S4 and SPDT switches S2, S3, S5, and S6 configured to transfer the pulse from loop A in the CW direction to loop B, and to transfer the pulse from loop B in the CCW direction to loop A.

Figure 18:
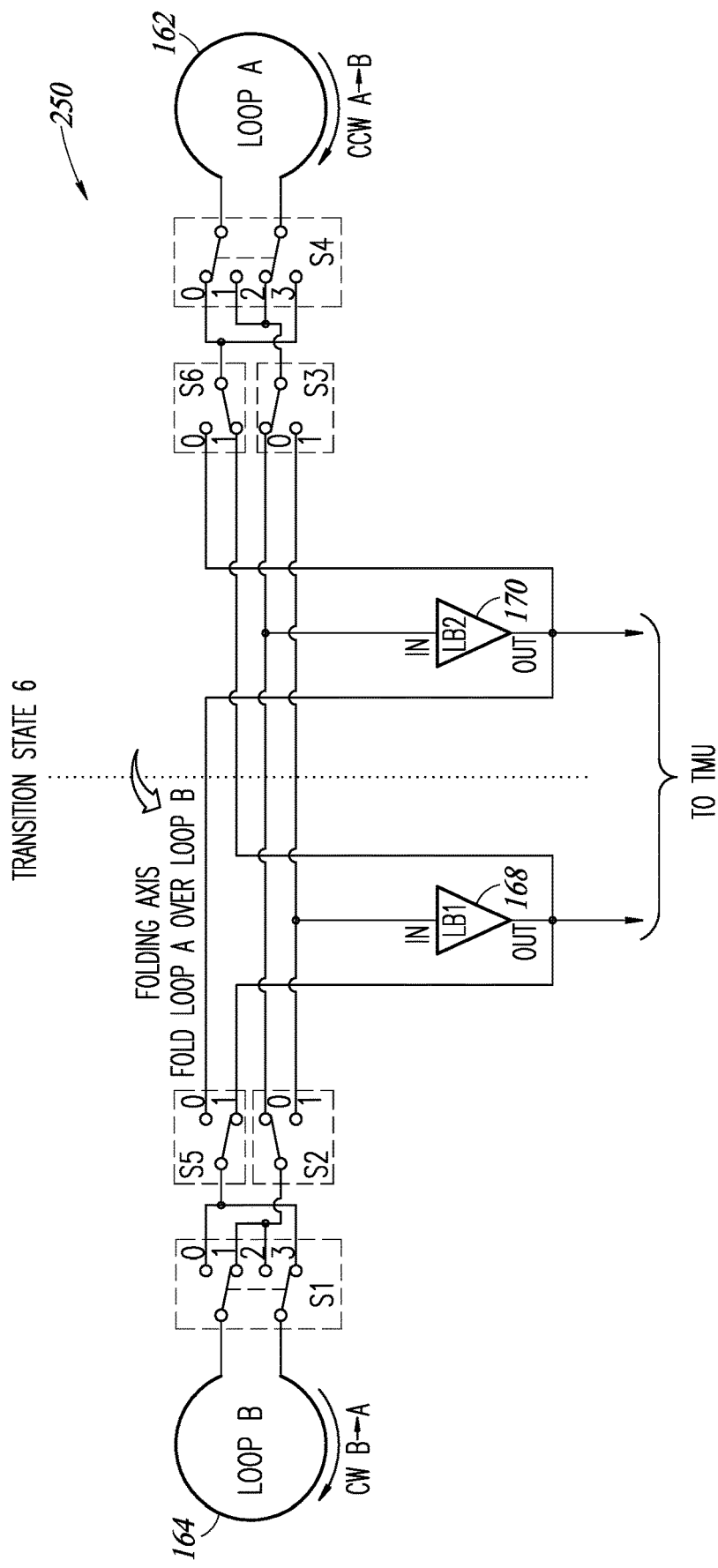
FIG. 18 is a diagram illustrating the configuration of the switching matrix during transition state 6.

A diagram illustrating the configuration of the switching matrix during transition state 6 is shown in FIG. 18. The configuration, generally referenced 250, shows DPDT switches S1, S4 and SPDT switches S2, S3, S5, and S6 configured to transfer the pulse from loop A in the CCW direction to loop B, and to transfer the pulse from loop B in the CW direction to loop A.

Figure 19:
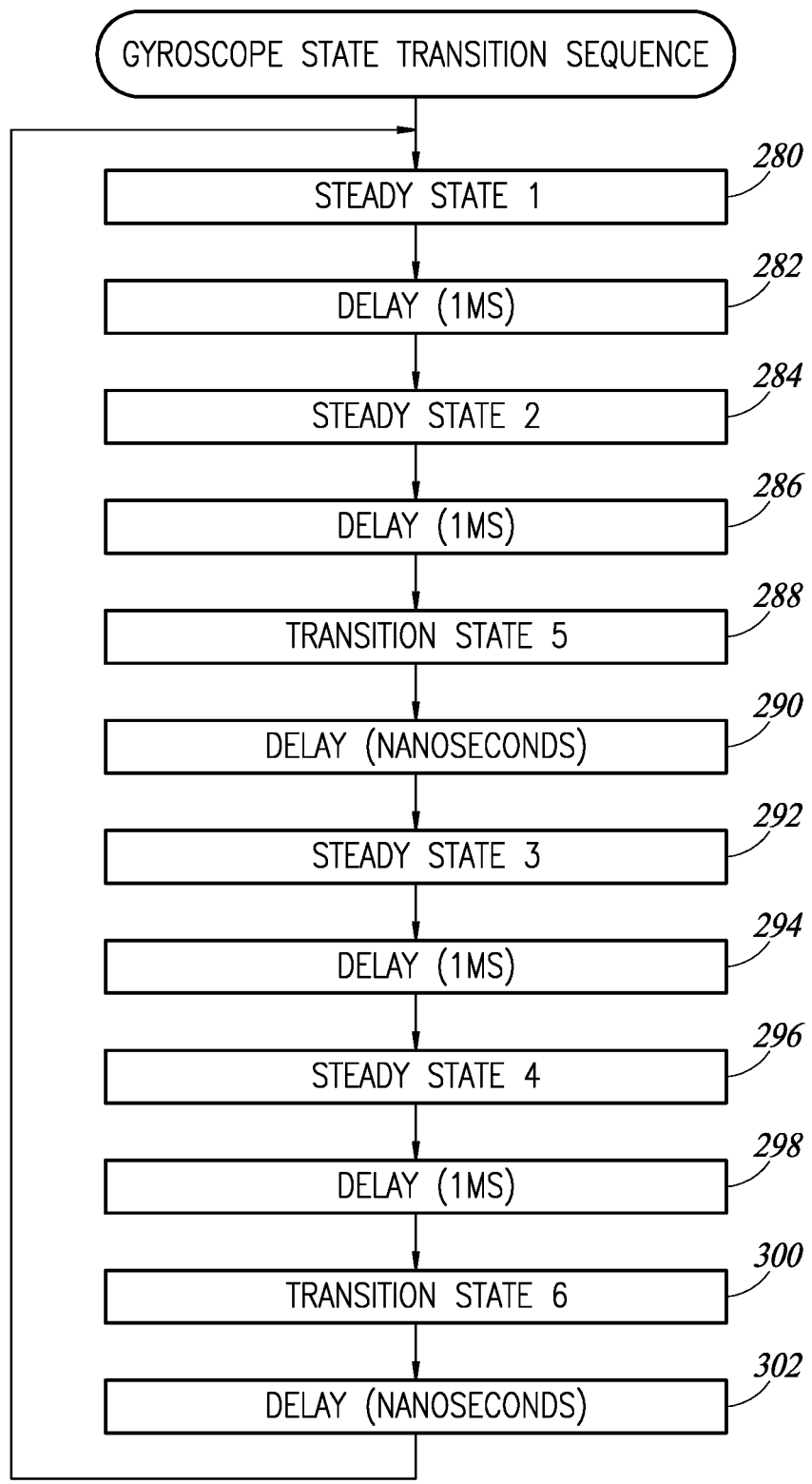
FIG. 19 is a diagram illustrating an example state sequence for the gyroscope circuit of FIG. 11.

A diagram illustrating an example state sequence for the gyroscope circuit of FIG. 11 is shown in FIG. 19. During operation, steady state 1 (step 280) is entered followed by a delay (step 282) of approximately 1 ms before entering steady state 2 (step 284) followed by another approximately 1 ms delay (step 286). Following the delay, transition state 5 (step 288) is entered where the pulses swap loops followed a relatively short delay on the order of nanoseconds (step 290). The system then transitions to steady state 3 (step 292) following by a delay (step 294) of approximately 1 ms before entering steady state 4 (step 296) followed by another approximately 1 ms delay (step 298). Following the delay, transition state 6 (step 300) is entered where the pulses swap loops followed a relatively short delay on the order of nanoseconds (step 302). The sequence then repeats itself.

As described supra, the sequence of swapping loops, rotation direction, and loop buffer circuitry, ensures that pulses in both directions run through both loops with both buffers thereby nullifying any systematic mismatch of loop lengths and buffer delay. In other words, any drift incurred by passing through circuit elements or a device in the signal path is applied equally to both CW and CCW signals. This minimizes any direction drift imperfection due to circuitry, device or device path mismatch and allows for the subtle Sagnac effect to be reliably detected. It also ensures that random or deterministic jitter impacts the CW and CCW signals equally when time averaged so they do not overshadow the Sagnac effect.

Figure 20:
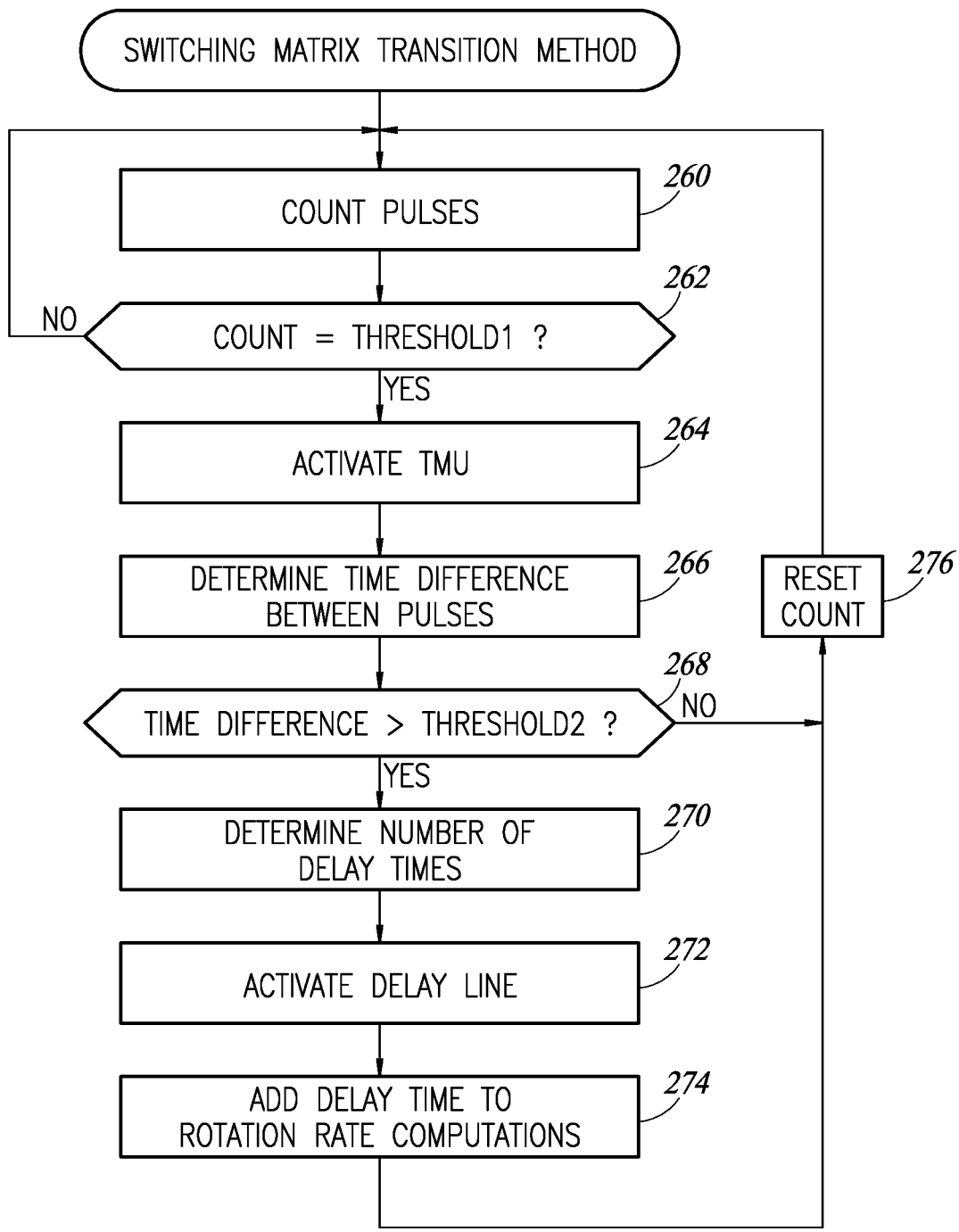
FIG. 20 is a flow diagram illustrating an example switching matrix transition method.

A flow diagram illustrating an example switching matrix transition method is shown in FIG. 20. During operation of the gyroscope sensor, the loop buffer or other suitable circuit is operative to count the number of pulses that pass through the loop buffer (step 260). If the count reaches a particular first threshold (step 262), the TMU is activated (step 264). The TMU may remain deactivated to reduce power consumption until it is needed. Once activated, the TMU determines the time difference between pulses (step 266). If the time difference does not exceed a second threshold (step 268), the count is reset and the method returns to counting pulses at step 260.

If the time difference does exceed the second threshold, it means the pulses have drifted too far apart and if the drift is allowed to continue accumulating, it may break the system. When the threshold is exceeded, one or more delays must be inserted into the path. The number of delay times and which pulse direction (CW or CCW) the correction needs to be applied to is then calculated using the measured time difference (step 270). The delay line is then activated for the appropriate number of delays and pulse direction (step 272) and the amount of delay is stored to be added to subsequent rotation rate computations (step 274).

Figure 21:
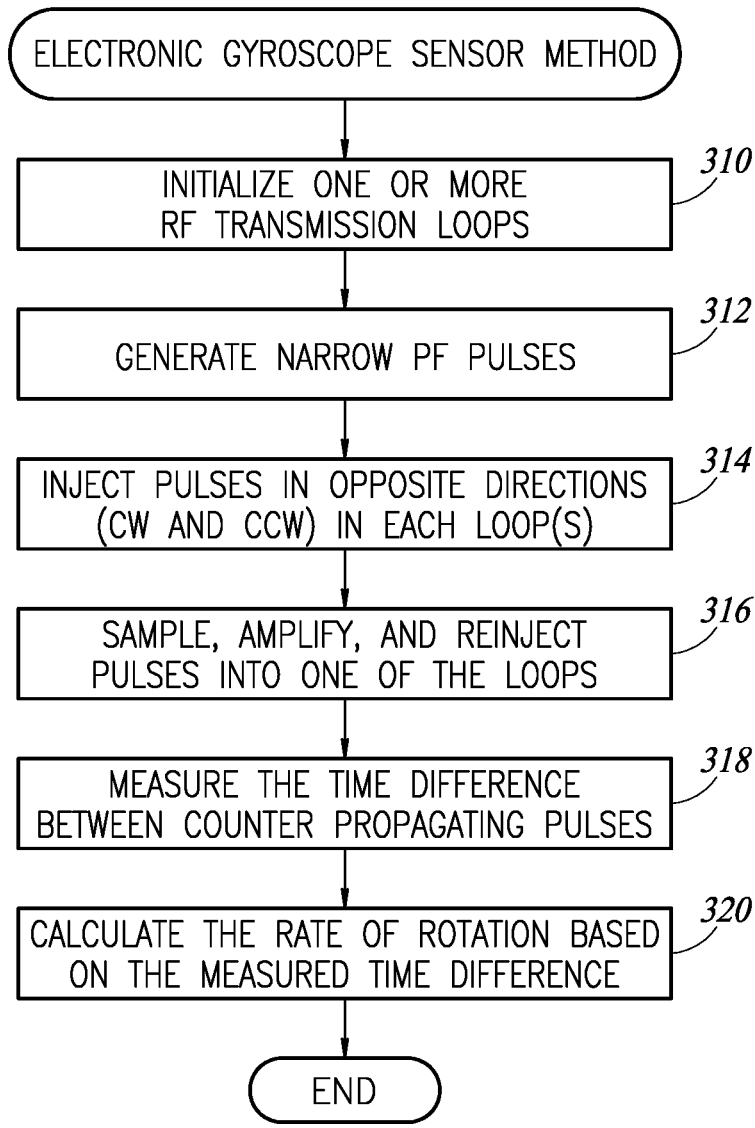
FIG. 21 is a flow diagram illustrating the electronic gyroscope sensor method of the present invention.

A flow diagram illustrating the electronic gyroscope sensor method of the present invention is shown in FIG. 21. This method is applicable to any of the gyroscope sensor embodiments described supra, e.g., see FIGS. 5, 8, 9, 11. First, the one or more RF transmission loops is initialized to cancel or remove any existing signal in the loop(s) (step 310). Relatively narrow RF pulses are then generated (step 312) and injected in opposite directions (i.e. CW and CCW directions) in each of the loop(s) (step 314).

The counter propagating pulses are sampled, amplified, and reinjected into one of the loops (step 316). The time difference between the counter propagating pulses is measured (step 318) and the rate of rotation of the loop(s) is calculated based on the time difference measured (step 320).

Loop Buffer Delay Line Operation

As described supra, the loop buffer circuit comprises a delay line. In one embodiment, this delay line is operated using the mux and demux circuits such that an additional time delay is introduced on a selective pulse by pulse basis. Preferably, the actual delay is significantly shorter than the loop delay (e.g., 1/10 of the loop delay) and is calibrated and taken into account for the Sagnac effect (i.e. the rotational velocity computation).

With reference to the single loop gyroscope sensor device of FIG. 9, due to the mismatches in the system, the pulses might drift apart and reach a point where both pulses arrive at the switch matrix in close temporal proximity. Since there is only one loop available (i.e. only one loop buffer circuit) then this situation is undesirable. In addition, the drift might cause the system to try and change the switch matrix configuration while a pulse is within it thereby breaking the system. Therefore, a second delay line DL2 148 is added in order to "store" the amplified pulse while setting the switches for the second pulse.

To prevent this situation from occurring, in one embodiment, the system keeps a safeguard duration (i.e. guard time) between the CW and CCW pulses around the optimal ½ loop length. To achieve this, the TMU samples the time difference between the pulses at regular intervals which is designed to be substantially faster than any mismatch drift. If the duration between the two pulses is too short, then the second pulse is retarded in time meaning the delay line is inserted into the signal path when the pulse goes through the loop buffer. On the other hand, if the duration between the two pulses is too long, then the first pulse between the two is retarded also using the delay line.

With reference to the double loop, double loop buffer gyroscope sensor device of FIG. 11, due to the mismatches in the system, the pulses might drift apart and reach a situation where the system attempts to enter a transition state but both pulses are out of phase and will not reach the switch matrix in close temporal proximity. Since the transition states are temporary and should be finely controlled, this situation is undesirable. The system thus needs to ensure that once those modes are initiated, both pulses will reach the switch matrix in close temporal proximity. In addition, the drift might also cause the system to try and change the switch matrix configuration, while a pulse is inside it thereby breaking the system.

To prevent this situation from occurring in this case, in one embodiment, the optimal position of the pulses prior to a transition state is such that both pulses should reach the switch matrix in close temporal proximity, i.e. time aligned at the input and output of the loops. To achieve this, prior to changing the switch matrix to a transition state, the system inserts a series of delays on either pulse sequentially to bring it close to the time of the second pulse, i.e. to within the delay line duration. The sequence is counted and taken into account in the Sagnac calculation.

Sagnac Computation

As described supra, the TMU is responsible for measuring and calculating the arrival time difference between the counter propagating pulses. This time delay comprises the initial time difference between the pulses, an accumulating time delay from the Sagnac effect which is proportional to the rotation rate, and an accumulating time delay from the mismatches in the system (i.e. the difference in loop length, the difference between various nodes in the switches, buffer propagation delay, etc.)

The time difference $\tau_n$ can be expressed in Equation 3 below.

$$\tau_n = \tau_{initial} + n\Delta T_{mismatch} = \Sigma_{k=0}^{n} \Delta T_{Sagnac}(n) + K(n)\Delta T_{DL} \quad (3)$$

and $$K(n) = (\text{\# CW delay activations}) - \text{\# (CCW delay activations)} \quad (4)$$

where:

$\tau_n$ represents the measured arrival time difference at time instance n as measured by the TMU;

$\tau_{initial}$ represents the initial injection time difference;

$\Delta T_{mismatch}$ represents the inherent mismatch between the paths;

$\Delta T_{Sagnac}(n)$ represents the Sagnac induced time of arrival difference at time instance n;

$\Delta T_{DL}$ represents the delay induced by the delay line in every single activation;

K(n) represents the net accumulated number of times the delay line was activated until time instance n;

From well-known Sagnac theory, it is known that the difference in the time of arrival due to the Sagnac effect is proportional to the mechanical rotation rate ω. The constant α depends on the loop geometry and wave propagation speed. Thus, the Sagnac induced time of arrival difference can be expressed in Equation 4 below.

$$\Delta T_{Sagnac}(n) = \alpha \omega(n) \quad (5)$$

and $$\alpha \approx \frac{4A}{c^2} \quad (6)$$

where:

A represents the area of the loop;

c represents the speed of light in the medium;

In one embodiment, the instantaneous rotation angular speed is derived by finding the backward/forward difference in the arrival time using Equation 6 below.

$$\tau_{n+1} - \tau_n = T_{mismatch} + \Delta T_{Sagnac}(n+1) + (K(n+1) - K(n))\Delta T_{DL} \quad (7)$$

Since the $T_{mismatch}$ is known using the calibration method described supra, α is known (a design parameter), the number of delay line activations is known, and the delay line duration is calculated during calibration we can compute ω(n) directly.

The gyroscope sensor also provides further information (which is not available in prior art MEMS Coriolis based gyroscopes) on the mechanical phase of the system with respect to the initial phase. The phase can be derived using the following:

$$\Delta\phi(n) = 2\pi \frac{\sum_{k=0}^{n} \Delta T_{Sagnac}(n)}{\frac{1}{2}(T_A + T_B)} \qquad (8)$$

where:

$\Delta\phi(n)$ represents the mechanical phase difference between the operation start and time instance n;

$T_A$, $T_B$ represents the time it takes the pulses to travel through loops A and B respectively;

Note that by combining three of the RF transmission loop or sets of loops described supra (see FIGS. 8 and 11, for example) and positioning them in mutually perpendicular planes (e.g., (roll, pitch and yaw), general three dimensional (3D) rotational movement may be quantified and digitally communicated to a host device.

In one embodiment, the circuitry not including the loop(s) is incorporated into the same integrated circuit and used to detect and measure movement in three dimensions allowing a signal processing unit to quantify a general three dimensional movement. Depending on the dimensions of the loops, the gyroscope or portions thereof can be incorporated into an IC that is used in a portable device, such as a mobile handset, to provide it with inertial navigation and movement detection and measurement capabilities.

Those skilled in the art will recognize that the boundaries between logic and circuit blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A radio frequency (RF) electronic gyroscope, comprising:

one or more electrically conductive loops;

a pulse generator circuit coupled to a switching matrix and operative to generate RF pulses for injection into said one or more loops in counter propagating directions at the same time;

said switching matrix circuit coupled to said one or more loops and operative to inject said RF pulses output of said pulse generator into said one or more loops in clockwise (CW) and counterclockwise (CCW) directions interleaved in time and propagating around the one or more loops at the same time;

a time measuring unit (TMU) circuit operative to measure a differential time delay developed between counter propagating pulses in said one or more loops due to the Sagnac effect; and a calculation unit circuit operative to compute a rate of rotation from said differential time delay measurement.

2. The RF electronic gyroscope according to claim 1, wherein said one or more loops is selected from the group consisting of a passive RF transmission media, coaxial cable, transmission line, strip line, microstrip, coplanar waveguide, RF waveguide, signal ended RF transmission media, differential RF transmission media, RF transmission media on an integrated circuit (IC) substrate, RF transmission media in an IC package, and RF transmission media on a printed circuit board (PCB).

3. The RF electronic gyroscope according to claim 1, wherein said pulse generator is operative to generate said RF pulses selected from the group consisting of narrow pulses, continuous wave modulated pulses, pulse trains, coded pulses, amplitude modulated (AM) pulses, frequency modulated (FM) pulses, chirp pulses, and pulse width modulated (PWM) pulses.

4. The RF electronic gyroscope according to claim 1, wherein said switching matrix comprises a plurality of switches operative to control the flow of said RF pulses around said one or more loops, from said pulse generator, and to said time measuring unit (TMU).

5. The RF electronic gyroscope according to claim 1, further comprising one or more loop buffer circuits, each loop buffer circuit operative to sample RF pulses output of one or more respective loops, amplify said sampled RF pulses, and redirect said amplified RF pulses back into the same or different respective loop.

6. The RF electronic gyroscope according to claim 5, wherein said one or more loop buffer circuits comprises a delay line operative to delay one or more RF pulses propagating in the CW or CCW direction around said one or more loops in order to control drift between pulses.

7. The RF electronic gyroscope according to claim 1, wherein said TMU circuit is selected from the group consisting of a linear or Vernier based time to digital converter (TDC) circuit, phase detection circuit utilizing mixing or averaging of square of sine waves, and demodulation utilizing a local oscillator and/or pulse counting with a local clock reference.

8. The RF electronic gyroscope according to claim 1, further comprising a pulse integrity unit (PIU) operative to maintain the shape of said RF pulses in the event they suffer narrowing or widening while propagating around said one or more loops.

9. The RF electronic gyroscope according to claim 1, wherein said calculation unit circuit is operative to take into account any systematic or mismatch based delay and calibration compensation applied to said RF pulses when calculating said rate of rotation from said differential time delay measurement.

10. The RF electronic gyroscope according to claim 1, further comprising a calibration circuit operative to generate and inject pulses into said one or more loops and provisioning said switching matrix to generate a path that is substantially Sagnac inert thereby measuring systematic mismatches in said one or more loops that introduce additional drift between said RF pulses.

11. A radio frequency (RF) electronic gyroscope, comprising:
a pair of electrically conductive loops;
a pulse generator circuit operative to generate RF pulses for injection into said loops in counter propagating directions at the same time;
a switching matrix circuit coupled to said loops and operative to inject said generated RF pulses into either of said loops in clockwise (CW) and counterclockwise (CCW) directions interleaved in time and propagating around the said loops at the same time;
a first loop buffer circuit coupled to said switching matric and operative to sample said RF pulses as they exit each loop, amplify said sampled RF pulses, and reinject said amplified RF pulses into either of said loops in CW or CCW direction in accordance with one or more switch control lines;
a time measuring unit (TMU) circuit operative to measure a differential time delay developed between counter propagating pulses in said pair of loops due to the Sagnac effect; and
a calculation unit circuit operative to compute a rate of rotation based on said differential time delay measurement.

12. The RF electronic gyroscope according to claim 11, wherein said switching matrix comprises a plurality of switches operative to control the sampling of said RF pulses output of one of said loops and the re-injection of amplified RF pulses back into the other said loop.

13. The RF electronic gyroscope according to claim 11, wherein said first loop buffer circuit comprises a delay line operative to delay one or more RF pulses propagating in the CW or CCW direction around said one or more loops in order to control drift between pulses.

14. The RF electronic gyroscope according to claim 11, further comprising a pulse integrity unit (PIU) operative to maintain the shape of said RF pulses in the event they suffer narrowing or widening while propagating around said one or more loops.

15. The RF electronic gyroscope according to claim 11, wherein said calculation unit circuit is operative to take into account any systematic or mismatch based delay and calibration compensation applied to said RF pulses when calculating said rate of rotation from said differential time delay measurement.

16. The RF electronic gyroscope according to claim 11, further comprising a calibration circuit operative to generate and inject pulses into said pair of loops and provisioning said switching matrix to generate a path that is substantially Sagnac inert thereby compensating for systematic mismatches in said one or more loops that introduce additional drift between said RF pulses.

17. The RF electronic gyroscope according to claim 11, further comprising a second loop buffer circuit coupled to said switching matrix thereby reducing switching rate requirements for said switching matrix.

18. A radio frequency (RF) electronic gyroscope method, the method comprising:
providing one or more electrically conductive loops;
generating and injecting one or more RF pulses into said one or more RF loops in clockwise (CW) and counterclockwise (CCW) directions interleaved in time and propagating around the one or more loops at the same time;
sampling and amplifying said RF pulses at the output of each loop and reinjecting restored RF pulses back into one of said loops;
measuring a differential time difference developed between counter propagating pulses in said one or more loops due to the Sagnac effect; and
computing a rate of rotation based on said differential time delay measurement.

19. The method according to claim 18, further comprising delaying one or more RF pulses propagating in the CW or CCW direction around said loops in order to control drift between pulses.

20. The method according to claim 18, further comprising generating and injecting calibration pulses into said one or more loops and provisioning a switching matrix coupled to said one or more loops to generate a path that is substantially Sagnac inert thereby measuring systematic mismatches in said one or more loops that introduce additional drift between said RF pulses.

* * * * *